United States Patent [19]

McLain, Jr. et al.

[11] Patent Number: 5,809,286
[45] Date of Patent: *Sep. 15, 1998

[54] METHOD AND APPARATUS FOR EMULATING A DYNAMICALLY CONFIGURED DIGITAL CROSS-CONNECT SWITCH NETWORK

[75] Inventors: John V. McLain, Jr.; James D. Dellinger, both of Colorado Springs, Colo.

[73] Assignee: MCI Communications Corporation, Washington, D.C.

[ * ] Notice: The term of this patent shall not extend beyond the expiration date of Pat. No. 5,748,617.

[21] Appl. No.: 641,458

[22] Filed: May 1, 1996

[51] Int. Cl.$^6$ .................................................. G06F 9/44
[52] U.S. Cl. ............................................... 395/500
[58] Field of Search .................................. 370/241, 242, 370/244, 250, 251, 252, 248, 249; 340/825.03, 826, 827; 364/550, 578; 395/500, 183.04, 183.05, 183.08, 183.09

[56] References Cited

U.S. PATENT DOCUMENTS

| | | |
|---|---|---|
| 4,552,297 | 11/1985 | Belanger et al. . |
| 4,555,602 | 11/1985 | Baxter, III et al. . |
| 4,575,797 | 3/1986 | Gruner et al. . |
| 4,636,948 | 1/1987 | Gdaniet et al. .......................... 346/300 |
| 4,737,985 | 4/1988 | De Luca et al. . |
| 4,799,251 | 1/1989 | Smith et al. . |

(List continued on next page.)

OTHER PUBLICATIONS

Tsukada et al., "The Multi–Project Support System Based on Multiplicity of Task," IEEE, 1994, pp. 358–363.
Palmer et al, Restoration in a partioned multi–bandwidth cross–connect network, IEEE 1990, pp. 81–85, Apr. 1990.
Martin, J. et al. TCP/IP Networking: Architecture, Administration and Programming, PTR Prentice Hall, Englewood Cliffs, NJ, pp. 6–8 (1994).
Minoli, D., "Telecommunications Technology Handbook," Artech House: Norwood, MA chapter 3, pp. 101–168 (1991).
Peterson, J. et al. "Introduction," Operating System Concepts, 2nd Edition, Addison–Wesley.

Primary Examiner—Kein J. Teska
Assistant Examiner—Dan Fiul

[57] ABSTRACT

A method and apparatus for emulating a digital cross-connect switching (DXC) network, such as a DXC 1/0 network, fully tests a telecommunication network monitoring and control system (MCS). The communication and behavior of a DXC network at the channel level are emulated in the presence and absence of selected network node and trunk configurations, failures, and/or normalizations. A communication module communicates with the MCS through emulator control links using a communications protocol substantially identical to a communications protocol used in the emulated digital cross-connect network. Configuration data representing the current behavior of the DXC nodes. Topology data traces logical trunks or channels through adjacent DXC nodes. The topology data further includes port provision data identifying the allocation of channels for cross-connected ports at DXC nodes. Additional DXC nodes and/or trunks can be added or deleted from the topology data during pre-processing or emulator operation to test different postulated network designs. The topology data can be updated in response to MCS channel level commands (i.e. grow/de-grow, connect/dis-connect, and cross-connect commands) to set up paths through provisioned ports in the emulated DXC network. Detailed knowledge of intermediate site and equipment within the emulated DXC network is not necessary to emulate different dynamic link connections and DXC topologies. Partial or total logical trunk outages can still be emulated by generating appropriate near-side port alarms. Simulated multi-tasking and dynamic user-interface control options are included.

43 Claims, 21 Drawing Sheets

U.S. PATENT DOCUMENTS

| | | | |
|---|---|---|---|
| 4,924,493 | 5/1990 | Dang et al. | 379/94 |
| 5,005,197 | 4/1991 | Parsons et al. . | |
| 5,008,812 | 4/1991 | Bhandarkar et al. | 364/200 |
| 5,027,343 | 6/1991 | Wing-Man Chan et al. . | |
| 5,095,505 | 3/1992 | Finucane et al. . | |
| 5,157,665 | 10/1992 | Fakhraie-Fard et al. | 371/20.1 |
| 5,170,362 | 12/1992 | Greenberg et al. . | |
| 5,187,740 | 2/1993 | Swaim et al. . | |
| 5,197,127 | 3/1993 | Waclawsky et al. | 395/200 |
| 5,222,120 | 6/1993 | McLeod et al. . | |
| 5,224,108 | 6/1993 | McDysan et al. . | |
| 5,226,041 | 7/1993 | Waclawsky et al. | 370/60 |
| 5,241,584 | 8/1993 | Hardy et al. . | |
| 5,276,440 | 1/1994 | Jolissaint et al. | 340/825.02 |
| 5,280,481 | 1/1994 | Chang et al. . | |
| 5,285,494 | 2/1994 | Sprecher et al. . | |
| 5,323,388 | 6/1994 | Chang et al. . | |
| 5,335,268 | 8/1994 | Kelly, Jr. et al. . | |
| 5,337,306 | 8/1994 | Hall . | |
| 5,343,461 | 8/1994 | Barton et al. | 370/13 |
| 5,355,405 | 10/1994 | Bernstein . | |
| 5,373,501 | 12/1994 | Roland . | |
| 5,375,126 | 12/1994 | Wallace . | |
| 5,375,159 | 12/1994 | Williams . | |
| 5,384,822 | 1/1995 | Brown et al. . | |
| 5,394,540 | 2/1995 | Barrington et al. | 395/500 |
| 5,396,616 | 3/1995 | Venable | 395/500 |
| 5,410,586 | 4/1995 | Davies | 379/14 |
| 5,414,858 | 5/1995 | Hoffman et al. | 395/725 |
| 5,435,003 | 7/1995 | Chng et al. | 395/575 |
| 5,438,528 | 8/1995 | Emerson et al. | 364/580 |
| 5,444,693 | 8/1995 | Arslan et al. | 370/16 |
| 5,488,648 | 1/1996 | Womble | 375/13 |
| 5,490,272 | 2/1996 | Mathis et al. | 395/650 |
| 5,513,345 | 4/1996 | Sato et al. | 395/182.02 |
| 5,557,795 | 9/1996 | Venable | 395/650 |
| 5,563,930 | 10/1996 | Pester, III | 379/34 |
| 5,594,792 | 1/1997 | Chouraki et al. | 379/269 |
| 5,600,632 | 2/1997 | Schulman | 370/252 |
| 5,636,345 | 6/1997 | Valdevit | 395/200.11 |

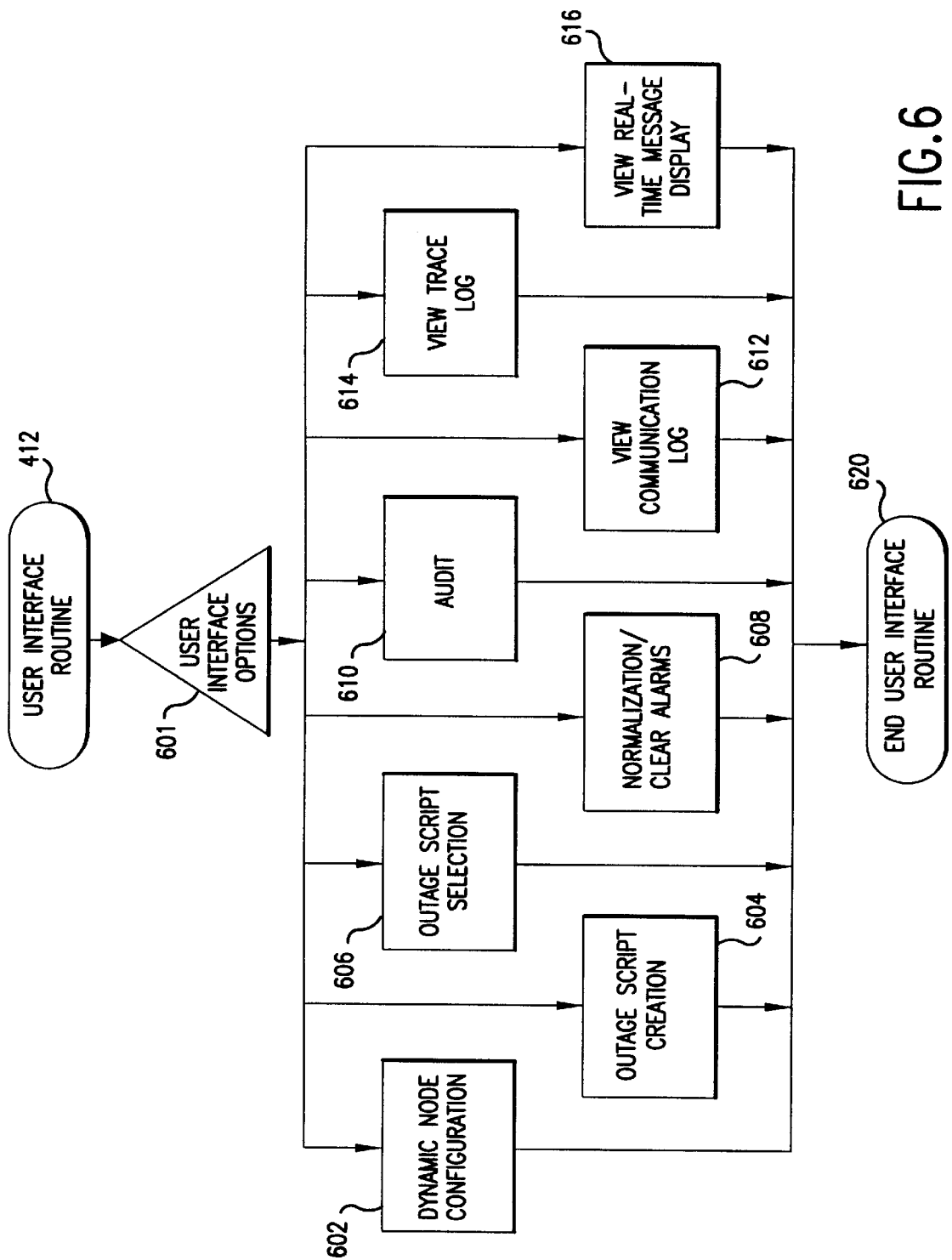

| 705 | 720 | 700 | | | | | | |
|---|---|---|---|---|---|---|---|---|
| (c) MCI 1992-96 | | DXC-1/0 EMULATOR | | | | | | VER. 3.00 |
| OPTIONS | HELP | | | | | | | |

730

| SEQ NUM | XMIT | LINK A ACS12345678 | LINK B ACS12345678 | DXC NAME | DXC TYPE | DXC NODE | Cmd RC | Cor Rsp | DTE |
|---|---|---|---|---|---|---|---|---|---|
| → 01 | ON | \|00000000000 | 00000000000\| | D01 01 | DSC | 1 | 00 | NO | ■ |
| 02 | ON | \|00000000000 | 00000000000\| | D02 01 | ALC | 2 | 00 | NO | ■ |
| 03 | ON | \|00000000000 | 00000000000\| | D03 01 | TEL | 3 | 00 | NO | ■ |
| 04 | ON | \|00000000000 | 00000000000\| | D04 01 | DSC | 4 | 00 | NO | ■ |
| 05 | ON | \|00000000000 | 00000000000\| | D05 01 | ALC | 5 | 00 | NO | ■ |
| 06 | ON | \|00000000000 | 00000000000\| | D06 01 | TEL | 6 | 00 | NO | ■ |
| 07 | ON | \|00000000000 | 00000000000\| | D07 01 | DSC | 7 | 00 | NO | ■ |
| 08 | ON | \|00000000000 | 00000000000\| | D08 01 | ALC | 8 | 00 | NO | ■ |
| 09 | ON | \|00000000000 | 00000000000\| | D09 01 | TEL | 9 | 00 | NO | ■ |
| 10 | ON | \|00000000000 | 00000000000\| | D10 01 | DSC | 10 | 00 | NO | ■ |
| 11 | ON | \|00000000000 | 00000000000\| | D11 01 | ALC | 11 | 00 | NO | ■ |
| 12 | ON | \|00000000000 | 00000000000\| | D12 01 | TEL | 12 | 00 | NO | ■ |
| 13 | ON | \|00000000000 | 00000000000\| | D13 01 | DSC | 13 | 00 | NO | ■ |
| 14 | ON | \|00000000000 | 00000000000\| | D14 01 | ALC | 14 | 00 | NO | ■ |
| 15 | ON | \|00000000000 | 00000000000\| | D15 01 | TEL | 15 | 00 | NO | ■ |
| 16 | ON | \|00000000000 | 00000000000\| | D16 01 | DSC | 16 | 00 | NO | ■ |
| 17 | ON | \|00000000000 | 00000000000\| | D17 01 | ALC | 17 | 00 | NO | ■ |
| 18 | ON | \|00000000000 | 00000000000\| | D18 01 | TEL | 18 | 00 | NO | ■ |
| 19 | ON | \|00000000000 | 00000000000\| | D19 01 | DSC | 19 | 00 | NO | ■ |
| 20 | ON | \|00000000000 | 00000000000\| | D20 01 | ALC | 20 | 00 | NO | ■ |
| 21 | ON | \|00000000000 | 00000000000\| | D21 01 | TEL | 21 | 00 | NO | ■ |
| 22 | ON | \|00000000000 | 00000000000\| | D22 01 | DSC | 22 | 00 | NO | ■ |
| 23 | ON | \|00000000000 | 00000000000\| | D23 01 | ALC | 23 | 00 | NO | ■ |
| 24 | ON | \|00000000000 | 00000000000\| | D24 01 | TEL | 24 | 00 | NO | ■ |
| 25 | ON | \|00000000000 | 00000000000\| | D25 01 | DSC | 25 | 00 | NO | ■ |
| 26 | ON | \|00000000000 | 00000000000\| | D26 01 | ALC | 26 | 00 | NO | ■ |

ADJACENT DXC SITES

| | HUB DXC: | D08 | 01 | | |
|---|---|---|---|---|---|
| SEQ NUM. | ADJACENT | | DXC | NODE ID | |
| 1 | D01 | 01 | DSC | 1 | |
| 2 | D07 | 01 | DSC | 7 | |
| 3 | D11 | 01 | ALC | 11 | |
| 4 | D15 | 01 | TEL | 15 | |
| 5 | D20 | 01 | ALC | 20 | |
| 6 | D25 | 01 | DSC | 25 | |
| 7 | D26 | 01 | ALC | 26 | |
| 8 | D33 | 01 | DSC | 33 | |

OK     EXIT

FIG.9

AUDIT DB

| D01 01 PORT | XPORT | START CN | TOTAL NC | STATUS | AlmTYPE | Cfg STATUS |
|---|---|---|---|---|---|---|
| 0003 | 0044 | 03 | 08 | P | 019 | 0006 |
| 0003 | 0044 | 20 | 05 | P | 000 | 0006 |
| 0004 | 0044 | 14 | 03 | P | 000 | 0006 |
| 0005 | 0045 | 02 | 22 | P | 000 | 0006 |
| 0006 | 0046 | 06 | 05 | P | 000 | 0006 |
| 0007 | 0047 | 11 | 14 | P | 000 | 0006 |
| 0008 | 0048 | 09 | 06 | P | 000 | 0006 |
| 0009 | 0049 | 04 | 11 | P | 000 | 0006 |
| 0010 | 0050 | 18 | 07 | P | 000 | 0006 |
| 0011 | 0051 | 12 | 01 | P | 000 | 0006 |
| 0012 | 0052 | 01 | 01 | P | 000 | 0006 |
| 0013 | 0053 | 06 | 07 | P | 000 | 0006 |
| 0014 | 0054 | 08 | 02 | P | 000 | 0006 |
| 0015 | 0055 | 04 | 01 | P | 000 | 0006 |
| 0016 | 0056 | 11 | 14 | P | 000 | 0006 |
| 0017 | 0057 | 22 | 02 | P | 000 | 0006 |
| 0018 | 0058 | 18 | 06 | P | 000 | 0006 |
| 0019 | 0059 | 07 | 03 | P | 000 | 0006 |

EXIT

D01 01    AUDIT DB CROSSCONNECTED CHANNELS

PORT = 0003              CHANNEL

| 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|
| XX | XX | 14 | 15 | 16 | 17 | 18 | 19 | 20 | 21 | XX | XX | XX | XX | XX | XX | XX | XX | XX | 03 | 04 | 05 | 06 | 07 |

PORT = 0044              CHANNEL

| 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|
| XX | XX | 20 | 21 | 22 | 23 | 24 | XX | XX | __ | __ | __ | XX | 03 | 04 | 05 | 06 | 07 | 08 | 09 | 10 | XX | XX | XX |

EXIT

FIG.17B

| COMMUNICATION LOG | | | | | |
|---|---|---|---|---|---|
| TIME | DXC | PORT | CKT | C/R | MESSAGE |
| 82611370 | DXC 01 | 0 | UNK | C | 0107000010601 |
| 82611560 | DXC 01 | 0 | UNK | R | 0108000118018000 |
| 82611650 | DXC 01 | 0 | UNK | C | 000700010600 |
| 82611780 | DXC 01 | 0 | UNK | R | 00080001060180000001 |
| 82611900 | DXC 01 | 0 | UNK | C | 00060001060280000100 |
| 82612000 | DXC 01 | 0 | UNK | C | 000100010603010101DFFFFFF7FFFEFFFF |
| 82612120 | DXC 01 | 0 | UNK | R | 000900010600801 |
| 82612180 | DXC 01 | 1 | ALM | C | 2800574243414C4D33010533020080 |
| 82612280 | DXC 01 | 1 | UNK | R | 2801574243414C4D8301 |
| 82612400 | DXC 01 | 1 | CNT | C | 28005742434344E543301053302080 |
| 82612460 | DXC 01 | 1 | UNK | R | 280157424343E54830 |
| 82612560 | DXC 01 | 1 | AUD | C | 2800574243415544330105330200080 |
| 82612680 | DXC 01 | 1 | UNK | R | 2801574243415544830 |
| 82612780 | DXC 01 | 1 | MML | C | 2800544850474D343301053302080 |
| 82612840 | DXC 01 | 1 | UNK | R | 28015448504740348301 |
| 82612930 | DXC 01 | 1 | UNK | C | 030100010610810000000000810000000 |

FIG. 18

METHOD AND APPARATUS FOR EMULATING A DYNAMICALLY CONFIGURED DIGITAL CROSS-CONNECT SWITCH NETWORK

CROSS-REFERENCE TO RELATED APPLICATIONS

This patent application is potentially related to the following commonly owned, co-pending U.S. utility patent applications:

1. "Method and Apparatus for Emulating a Digital Cross-Connect Switch Network," Ser. No. 08/641,459, by John V. McLain, Jr., filed concurrently herewith and incorporated herein by reference;

2. "Method and Apparatus for Simulating Multi-Tasking," Ser. No. 08/641,460, by John V. McLain, Jr., filed concurrently herewith and incorporated herein by reference; and 3. "Method and Apparatus for Emulating Digital Cross-Connect Network using a Flexible Topology to Test MCS Network Management," Ser. No. 08/641,461, by John V. McLain, Jr., filed concurrently herewith and incorporated herein by reference.

BACKGROUND OF THE INVENTION

1. Field of the Invention

The present invention pertains to data communication networks, such as long-distance telecommunication networks. More specifically, the present invention relates to testing network monitoring and/or control systems.

2. Related Art

A communication network serves to transport information among a number of locations. The information is usually presented to the network in the form of frequency-domain or time-domain electrical signals representing any combination of telephony, video, or computer data in a variety of analog and/or digital formats. A typical communication network has various physical sites, called nodes, interconnected by information conduits, called "links." Each link serves to carry data from one node to another node. Individual nodes contain equipment for combining, separating, transforming, conditioning, multiplexing/de-multiplexing, and/or routing data.

Digital cross-connect switches (DXC) are often provided at a site or node to switch traffic, electrically or optically, to an alternative link to alleviate congestion, avoid a link failure, or fulfill any other network configuration or restoration order. A central monitoring and/or control system (MCS) communicates with each node. Among other functions, the MCS monitors and controls digital cross-connect switching at nodes to route data through the network according to well-known network management and restoration techniques. The MCS is further responsible for dynamically establishing and breaking down logical trunk or channel connections between DXC nodes to provide dedicated point-to-point paths for customers.

The role of the MCS in a communication network, for purposes of (1) network management (i.e. traffic monitoring, control, and restoration) and (2) establishing dynamic trunk connections, has become even more vital as networks grow in size, complexity, and data capacity. The traffic of a single link through a digital cross-connect switch now represents a formidable volume of data—equivalent to tens of thousands of phone calls or more. Any delay or failure by an MCS to detect and respond to a link-failure can cause a significant loss in revenues for a network owner and loss of commerce and other benefits for the network subscribers. The demand for temporary dedicated lines continues to escalate as telecommunications customers send greater amounts of electronic data more often. Thus, it is increasingly important that a MCS be fully tested before it is relied upon to serve a communication network.

A specific case for testing arises when the MCS is relied upon for dynamically configuring a DXC network through channel level commands. For example, DXC 1/0 networks are used primarily for dynamic call setup and breakdown to provide such telecommunications services as a Virtual Private Line. A DXC 1/0 node is a switching device used in telecommunications networks primarily to switch DS-0 trunks (also called channels) on incoming DS-1 ports to certain outgoing DS-1 ports, based on commands it receives from an external control system. DXC 1/0 nodes also generate alarms, which are triggered when a trunk is knocked out-of-service due to a network outage, such as a fiber cut.

An MCS is called upon to issue channel level commands (i.e. grow/degrow, connect/dis-connect, and cross-connect commands) to set up paths through provisioned ports in a DXC 1/0 network. The MCS still continues to monitor and respond to alarms from the DXC 1/0 nodes. This provides an important commercial advantage by allowing a customer to utilize a personal dedicated line for a call without incurring the expense of buying a permanent private line.

To fully test MCS performance, the MCS must be stressed by the behavior of an entire digital cross-connect network. As discussed above, a typical network can include hundreds or more nodes having digital cross-connect switching capability. Each digital cross-connect switch node often has many network node control links and ports. Each node control link in turn supports multiple communication sessions between the node and the MCS regarding audit and status states, alarms, network outages, etc. Given this complexity, to use an actual digital cross-connect network in a test environment to fully-test an MCS is impractical and cost-prohibitive.

Prior to the present invention, the behavior of a telecommunication switching network has not been fully emulated to test a MCS. Network behavior has not been emulated on any scale to test an MCS, especially in an environment where processing power is limited as in a personal computer system.

What is needed is a computer-implemented method and apparatus for emulating an entire digital cross-connect switch network to allow realistic MCS testing prior to actual implementation. The complete range of functionality of an MCS, including channel level commands for dynamic port provisioning and path configuration, needs to be stressed. Communication between the MCS and a digital cross-connect network having hundreds or more network node control links needs to be emulated in the presence and absence of selected network failures and in the presence and absence of dynamically configured trunk connections.

For purposes of fully testing an MCS, it is further desired that digital cross-connect network behavior be emulated substantially in parallel with the processing of dynamic user-inputs and/or MCS commands identifying selected network node and trunk configurations (including dynamic port provisioning and path configuration), failures, and/or normalizations. It is also desirable that an MCS be fully tested inexpensively using a personal computer which emulates network behavior and responds to user and/or MCS inputs identifying selected network node and trunk configurations (including dynamic port provisioning and path configuration), failures, and/or normalizations.

SUMMARY OF THE INVENTION

The present invention provides a computer-implemented method and apparatus for emulating a digital cross-connect switch (DXC) network to fully test a telecommunication network monitoring and/or control system (MCS). An advance in the ability to fully test an MCS is obtained by emulating the behavior of a digital cross-connect switching network in the presence and absence of dynamically selected network node configurations, trunk connections, failures, and/or normalizations. Solicited and unsolicited communication between the MCS and a DXC network emulator of the present invention is emulated to match actual communication between the MCS and a DXC network in the presence and absence of selected network node configurations, inter-DXC trunk connections, failures, and/or normalizations.

In one embodiment, emulator messages are generated which emulate solicited and unsolicited messages sent from DXC nodes to an MCS in the presence and absence of selected network node and trunk configurations, failures, and/or normalizations. The content and protocol of the emulator messages matches the response and alarm messages which are generated by actual DXC nodes.

According to a further aspect of the invention, only emulator messages for an enabled network control link are sent over a corresponding emulator control link. In this way, the communication between each DXC node and the MCS over respective network node control links is emulated.

Further features of the present invention for emulating a digital cross-connect network to test an MCS include simulated multi-tasking and user-interface control options. In particular, the DXC emulator switches between servicing MCS inputs and user-inputs to substantially simulate multi-tasking and provide sub-second response. These switches are transparent to the user and the MCS which perceive the emulator to be servicing MCS communication and user-inputs continuously and in parallel.

Emulator control options entered through the user-interface include: dynamic node configuration, outage script creation, outage script selection, normalization/clear alarms, audit, and viewing a communication log, trace log, and a real time message display. Node failure and trunk failure (including partial failures such as selected logical trunk failures) are emulated.

Different types of digital cross-connect switching networks and systems are emulated on a personal computer with sub-second response to test an MCS including DXC 3/3 networks, hybrid DXC 3/1 and 3/3 networks, and/or DXC 1/0 networks.

In one example of the present invention for emulating a DXC network to test a MCS, a communication module communicates to the MCS over emulator primary and secondary control links using a substantially identical communication protocol as the emulated DXC network. These emulator primary and secondary control links represent respective network node primary and secondary control links for each DXC node being emulated.

Configuration data is stored in emulator memory and updated during the emulator operation to represent the behavior of the emulated DXC network. Topology data which describes the current and/or baseline topology of the emulated DXC network is also stored in emulator memory. The configuration data, among other things, records, enabled or disabled node control links. The topology data, among other things, speeds generation of navigation displays, outage scripts, and responses to MCS audits.

An intelligence module is provided which includes a simulated multi-tasking controller for switching control between a control-link servicer and a user-interface servicer. An emulator processor controls the sending of solicited and unsolicited emulator messages. An emulator message generator generates the emulator messages based on configuration data and/or topology data identifying DXC node responses to MCS commands and alarms. An emulator link selector further determines enabled network node control links for DXC nodes from the configuration data.

In one embodiment for emulating a dynamically configured DXC network such as a DXC 1/0 network, the topology data traces logical trunks, also called channels, through adjacent DXC nodes. The topology data further includes port provision data identifying the allocation of channels for cross-connected ports at DXC nodes. Additional DXC nodes and/or trunks can be added or deleted from the topology data during pre-processing or emulator operation to test different postulated network designs. The topology data can be updated in response to MCS channel level commands (i.e. grow/de-grow, connect/dis-connect, and cross-connect commands) to set up paths through provisioned ports in the emulated DXC network. Detailed knowledge of intermediate site and equipment within the emulated DXC network is not necessary. Partial or logical trunk outages can still be emulated by generating appropriate near-side port alarms at adjacent DXC nodes facing the emulated trunk failure.

Further features and advantages of the present invention, as well as the structure and operation of various embodiments of the present invention, are described in detail below with reference to the following drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention.

FIG. 6 is a flowchart illustrating the operation of an User-Interface routine in more detail.

FIG. 7A is a screen display used in an example of the present invention for navigation through a configuration file.

FIGS. 9 and 10 are screen displays used in an example of the present invention for creating an outage script according to the process of FIG. 8.

FIGS. 17A and 17B are screen displays used in an example of the present invention illustrating the operation of another DXC emulator control option for auditing the emulated network node configuration including channels allocated through cross-connected ports.

FIGS. 18, 19, and 20 are screen displays used in an example of the present invention. FIG. 18 illustrates the operation of another DXC emulator control option allowing navigation through a communication log file. FIG. 19 illustrates the operation of another DXC emulator control option allowing navigation through a trace log file. FIG. 20 illustrates the operation of another DXC emulator control option allowing navigation through a real-time message display.

Figure 1:
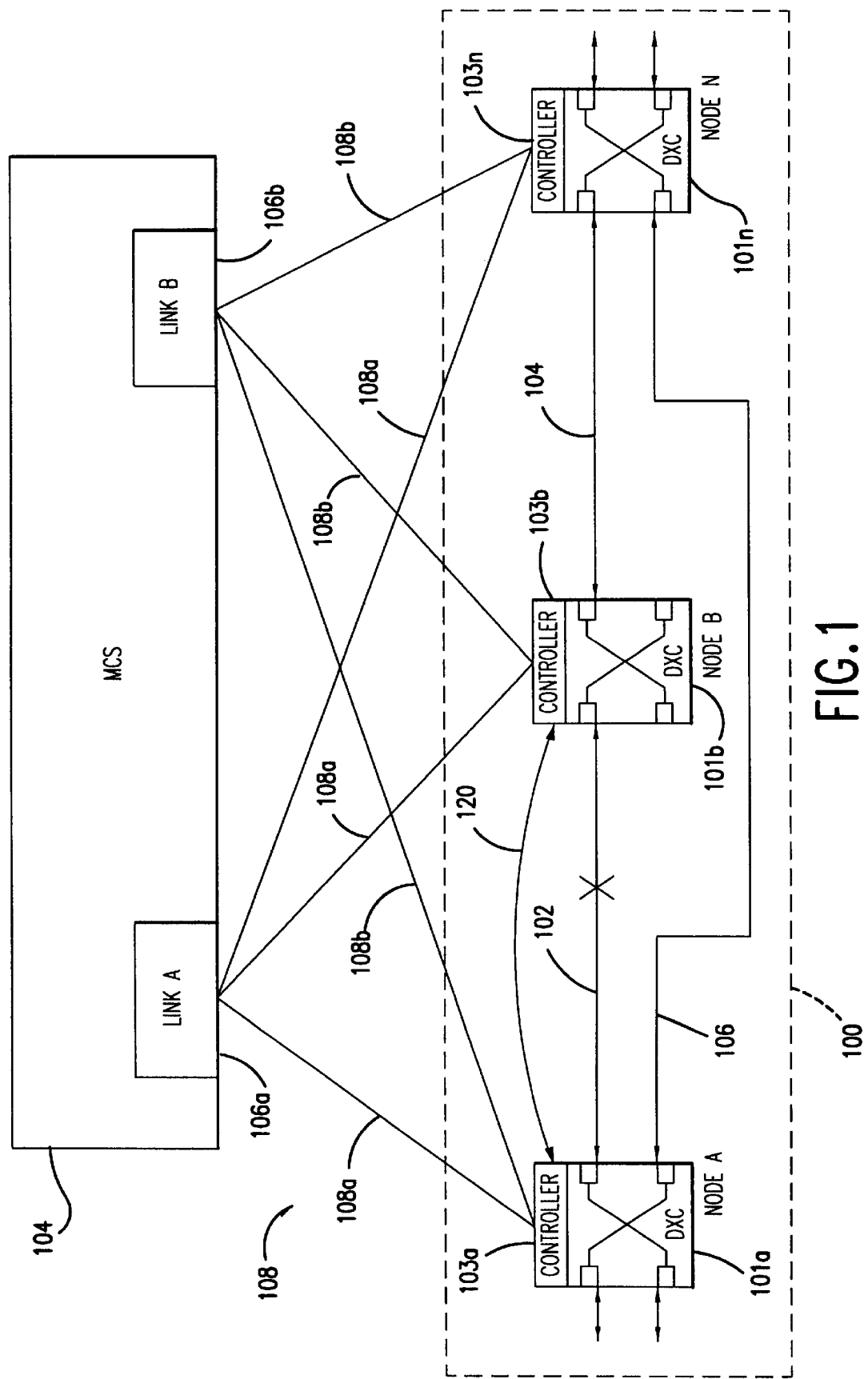
FIG. 1 is a block diagram showing selected nodes of a digital cross-connect (DXC) network coupled to a Monitoring and Control System (MCS).

The present invention will now be described with reference to the accompanying drawings. In the drawings, like reference numbers typically indicate identical or functionally similar elements. Additionally, the left-most digit(s) of a reference number typically identifies the drawing in which the reference number first appears.

DETAILED DESCRIPTION OF THE PREFERRED EMBODIMENTS

Table of Contents
Overview
Terminology
Example Environment
Digital Cross-Connect Switching Network
DXC Network Emulator for Testing a MCS
  Emulator Architecture
  Emulator Operation
    Simulated Multi-Tasking
    Responses to MCS Commands
    Responses to User-Inputs
      Emulator Control Options
      Dynamic Node Configuration
      Outage Emulation
        Outage Script Creation
        Outage Script Selection
      Normalization/Clear Alarms
      Other Control Options
DXC Network Type
Conclusion

Overview

The present invention provides a computer-implemented method and apparatus for emulating a digital cross-connect network to fully test a telecommunication network monitoring and control system (MCS). Both the communication between each digital cross-connect switching node and the MCS and the behavior of a digital cross-connect switching network are emulated in the presence and absence of selected network node and trunk configurations, failures, and/or normalizations. Sub-second responses (solicited and unsolicited) which emulate DXC network behavior for purposes of testing an MCS are obtained.

In one embodiment for emulating a dynamically configured DXC network such as a DXC 1/0 network, topology data traces logical trunks, also called channels, through adjacent DXC nodes. The topology data further includes port provision data identifying the allocation of channels for cross-connected ports at DXC nodes. Additional DXC nodes and/or trunks can be added or deleted from the topology data during pre-processing or emulator operation to test different postulated network designs. The topology data can be updated in response to MCS channel level commands (i.e. grow/de-grow, connect/dis-connect, and cross-connect commands) to set up paths through provisioned ports in the emulated DXC network. Detailed knowledge of intermediate site and equipment within the emulated DXC network is not necessary. Partial or logical trunk outages can still be emulated by generating appropriate near-side port alarms at adjacent DXC nodes facing the emulated trunk failure.

Terminology

To more clearly delineate the present invention, an effort is made throughout the specification to adhere to the following term definitions as consistently as possible.

The term "digital cross-connect switch network," and equivalents thereof, refer to any type of communication network having at least some nodes which include digital cross-connect switches. These digital cross-connect switches can switch network data electrically or optically through multiple ports. Any type of network data and format can be switched at each node by providing known multiplexers and/or light conversion elements. For example, each node can switch time-domain signals at different bit rates in any of DS0 to DS4 type formats and/or OC-1 to OC-198 formats.

A DXC 3/3 network refers to a DXC network which includes a plurality of DXC 3/3 nodes for switching high-speed DS3 data signals. A DXC 3/3–3/1 network refers to a hybrid DXC network which includes a plurality of DXC 3/3 nodes for switching high-speed DS3 data signals and a plurality of DXC 3/1 nodes for switching low-speed DS1 and/or high-speed DS3 data signals. A DXC 1/0 network refers to a DXC network which includes a plurality of DXC 1/0 nodes for switching low-speed DS0 and/or DS1 data signals.

The abbreviation "DXC" is used broadly herein to refer to a digital cross-connect switch network, and is not intended to exclude other types of abbreviations or terms found in the industry to refer to digital cross-connect networks such as DSC, DXS, DACS (Digital Access and Cross-Connect System), BB-DXC (broadband digital cross-connect), slow-switch, nailed-up switch, and channel switch. Digital cross-connect switch capability found in system components such as T1 multiplexers is also covered by the terms digital cross-connect network and DXC as used herein.

The terms "Monitoring and Control System," and equivalents thereof, refer to a centralized system or a remote system feeding to a central system, which communicates with individual switching nodes of the digital cross-connect network to monitor and/or control network operations such as real-time network restoration, dynamic configuration, private line service, load balance and traffic flow. The MCS can communicate with a controller to control digital cross-connect switching and/or can communicate with a digital cross-connect switch directly.

The abbreviation "MCS" is used broadly herein to refer to a Monitoring and/or Control System, as defined above, and is not intended to exclude other types of abbreviations found in the industry to refer to network monitoring and/or control systems such as, OSS (Operational System Support) and RTR (Real Time Restoration Software).

Example Environment

The present invention is described in the example environment of a computer which fully tests an MCS product in the presence and absence of selected network failures prior to installation by emulating a digital cross-connect network. Different types of digital cross-connect networks are emulated including a DXC 3/3 network, hybrid DXC 3/1 and 3/3 network, and/or a DXC 1/0 network. Description in these terms is provided for convenience only. It is not intended that the invention be limited to application in this example environment. In fact, after reading the following description, it will become apparent to a person skilled in the relevant art how to implement the invention in alternative environments.

Digital Cross-Connect Switching Network

FIG. 1 shows a block diagram of an example digital cross-connect switching network (DXC) 100 being emulated according to the present invention. In the field, the DXC network 100 communicates with an MCS 104 through network control links 108. DXC network 100 comprises a DXC 1/0 network. Alternatively, a DXC 3/3 network, a hybrid DXC 3/3 and 3/1 network, or any other type of communication switching network can be emulated according to the present invention.

DXC network 100 consists of a plurality of DXC switching nodes A to N. Only three nodes A, B, and N with digital cross-connect switching capability are shown for simplicity. In general, any number of nodes can be included. For example, long-distance communication carriers employ hundreds and even thousands of switching nodes within a local, regional, national, or global digital cross-connect network.

Each node is interconnected to other nodes through transmission links, also called inter-DXC trunks or channels 102–106. In FIG. 1, an inter-DXC trunk 102 links nodes A and B, an inter-DXC trunk 104 links nodes B and N, and an inter-DXC trunk 106 links nodes A and N. Each of these inter-DXC trunks 102–106 can consist of one or more physical and/or logical trunks and extend to other nodes (not shown). Each inter-DXC logical trunk 102–106 can transport electrical, optical, microwave, radio, and/or satellite data signals. For example, copper wire, coaxial cable, optical fiber, broadcast systems, and/or satellites can be used as the physical medium for one or more transmission links.

Nodes can be interconnected through inter-DXC trunks and links according to mesh, ring, point-to-point, star, tandem, multi-level hierarchies or any other type of network topology design. Connectivity among the various nodes by inter-DXC trunks may take on a multitude of configurations (physical and logical), depending on the needs of the network.

Inter-DXC trunks can further include intermediate sites and/or terminal equipment (not shown). These sites serve primarily as points of traffic termination and redirection of transmission routes. Different types of communication equipment are typically attached at intermediate sites along a trunk, such as: remote terminals, computers, servers, routers, repeaters, private networks (e.g. LANs), analog or digital switches, transcoders, channel banks, T1 multiplexers, feeder plant and distribution plant equipment, line termination equipment, and path termination equipment. The number of intermediate sites, the configuration of intermediate sites, and the type of equipment provided at each site varies depending on the design, needs and geography of the network. See, e.g., D. Minoli, *Telecommunications Technology Handbook,* Chapter 3: Digital Transmission Systems, (Artech House: Norwood, Mass.), 1991, pp. 101–168 (incorporated by reference herein).

In the event of a failure impairing traffic through a node or trunk, the MCS 104 is responsible for real-time restoration of network traffic. The MCS 104 can also be used to dynamically establish and breakdown logical path connections as part of an enhanced private line service. Such logical path connections can consist of one or more inter-DXC trunks connected in series through the DXC network 100.

As shown in FIG. 1, each switching node A, B, and N includes a digital cross-connect switch 101 and a controller 103. For simplicity, only a 2×2 digital cross-connect switch 101 is shown which effectively switches data between two ports on each side of the switch. The number of ports, however, can be much greater depending upon the particular application and the available electrical and optical switch technology. During physical installation of a DXC node in the network, ports which can support traffic are provisioned. Each provisioned port can support one or more logical inter-DXC trunks or channels.

Controllers 103 can each consist of hardware, custom logic, and/or software implemented on a computer, processor, micro-processor, or other type of processing and control system. Each controller 103 controls the switching of a respective digital cross-connect switch 101 and communicates with the MCS 104, i.e. a central office. Preferably, at least one primary network control link 108A and a redundant secondary network control link 108b is provided to ensure reliable communication between each respective switching node A to N and the MCS 104 as shown. Fault processing can be included in each controller 103 to monitor the state of the switch 101 and to determine and report any link failures affecting a respective node. Alternatively, the fault processing and monitoring functionality of the controllers 103 can be incorporated into the MCS 104; however, this can be impractical in larger distributed networks.

Consider a link failure such as a fiber cut or intermediate equipment failure which occurs at the spot X along inter-DXC trunk 102. Controllers 103 at nodes A and B communicate status information with each other through a highly-reliable off-band digital communication network (DCN) 120 according to known protocol, i.e. X.25. For example, if data traffic typically sent from node A does not reach node B, a loss-of-signal message can be generated by controller 103 at node B indicating loss-of-signal at node B. The controller 103 at node A likewise can generate an alarm if an acknowledgment of the receipt of data by node B is not received. In this way, controllers 103 can communicate with each other through an off-band DCN 120 to confirm fault detection. Reliable alarm messages are then sent from either or both of the controllers 103 at nodes A and B to MCS 104. See, e.g., the discussion of a DCN and an OSS for controlling an digital cross-connect network in the commonly-owned, co-pending U.S. patent application, Ser. No. 08/580,391 "Method and System for Detecting Optical Faults Within the Optical Domain of a Fiber Communication Network," by Shoa-Kai Liu (incorporated herein by reference).

The separate DCN network 120 and the processing to confirm fault detection by the controllers 103, as in a Distributed Restoration Algorithm (DRA), is clearly optional. For purposes of the present invention, a digital cross-connect network being emulated need not have a separate DCN 120 linking controllers 103 as all intelligence can be incorporated into the MCS 104.

Status messages are generated by controllers 103 and sent to MCS 104 to indicate, acknowledge, or confirm a link or node state including idle, active, inactive, or detected fault states. In the event of the link failure X, an alarm message indicating the link failure is ultimately sent from either or both of the controllers 103 at nodes A and B to the MCS 104. The digital cross-connect switch 101 at node A is then switched by controller 103, in response to MCS 104 commands, to direct traffic along a different physical and/or logical inter-DXC trunk 106, thereby, avoiding the link failure X. The MCS 104 commands can be originated at a central monitoring and/or control system, a local node test console, or a remote test unit.

Monitoring and Control System (MCS) 104 provides the intelligence to the network 100 via monitoring and control of the DXC nodes A to N. MCS 104 monitors and controls the DXC nodes A to N via network control links 108 which connect the MCS 104 to each node. For each node, there is a primary control link 108a and a redundant secondary control link 108b. These network control links, which are standard communication channels, are connected to the MCS 104 via a Link A 106a for primary control links and Link B 106b for secondary control links. Link A 106a and Link B 106b represent data termination equipment needed to connect the communication channels in links 108a and 108b to a computer supporting the MCS 104.

Finally, in practice, a redundant MCS (not shown) is often connected to Links 106a and 106b as a back-up or watchdog in the event of MCS 104 failure.

DXC Network Emulator for Testing a MCS

Figure 2:
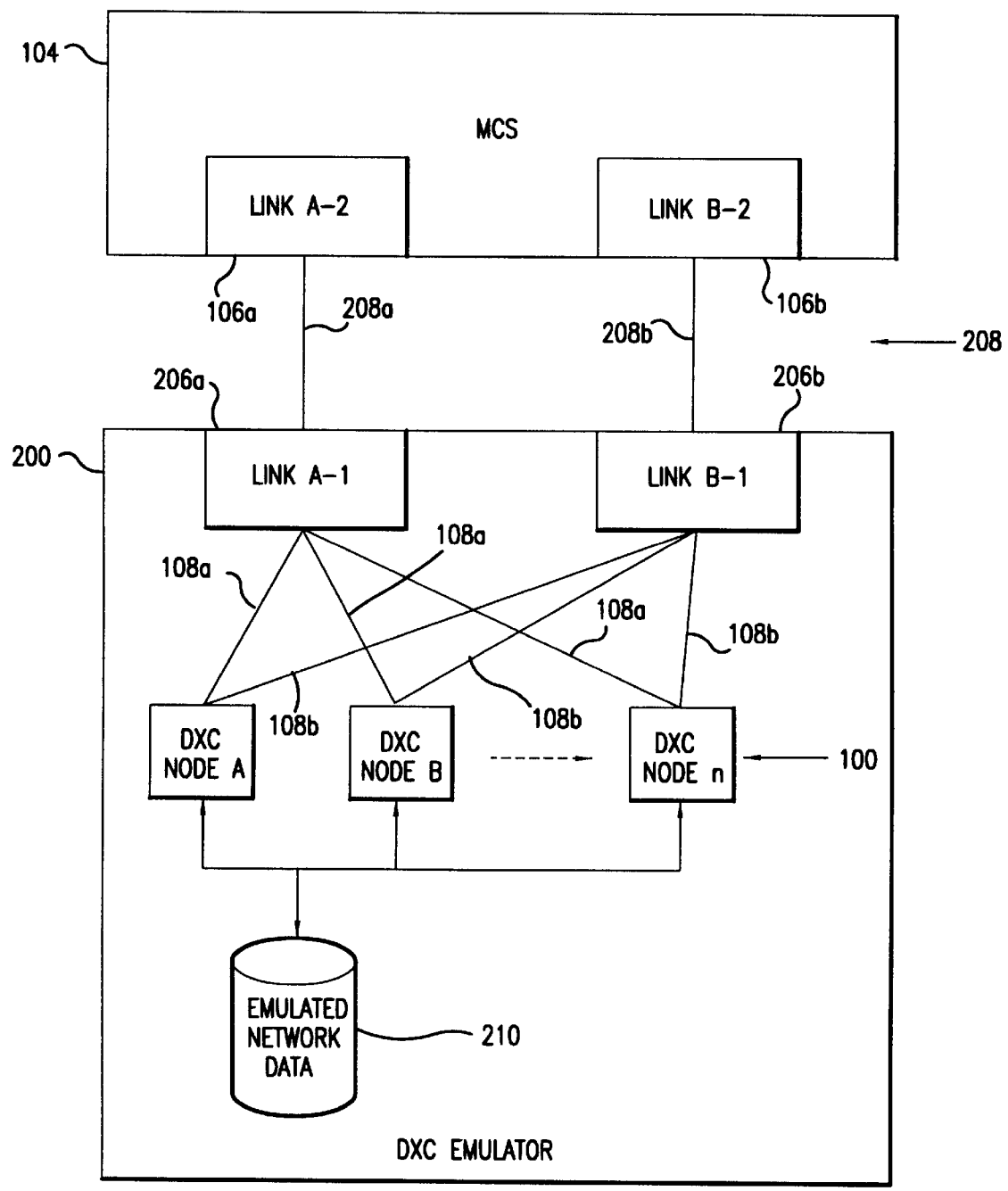
FIG. 2 is a functional diagram of a DXC Network Emulator according to the present invention showing logical connectivity of emulated nodes to the MCS being tested.

Referring to FIG. 2, there is shown a simplified functional diagram of a DXC Emulator 200 according to the present invention which emulates behavior of a DXC network to test an MCS. The emulated DXC network can include, for example, the DXC 1/0 network 100 described earlier with respect to FIG. 1.

The Emulator 200 is connected to an MCS 104 through two bi-directional communications links, that is, primary and secondary emulator control links 208a and 208b. The primary emulator control link 208a bridges MCS Link A-2 106a and Emulator Link A-1 206a. Likewise, the secondary emulator control link 208b bridges MCS Link B-2 106b and Emulator Link B1-1 206b.

The primary emulator control link 208a and the secondary emulator control link 208b are simply multiplexed extensions emulating the primary and secondary network node control links 108a and 108b respectively at each DXC node A–N. Data can be transmitted over each of these emulator control links 208a and 208b in any standard data communications protocol such as X.25, TCP, IP, Frame-Relay, ATM, SMDS, Ethernet, FDDI, ISDN, SDLC, BISDN, and any other LAN or WAN data link protocol. See, e.g. Martin J. and Leben J., TCP/IP Networking Architecture, Administration, and Programming (Prentice Hall: New Jersey 1994), pages 6–8, incorporated by reference herein. An X.25 packet protocol and associated virtual logic circuits are used in a preferred embodiment to allow reliable multiplexing and logical routing of MCS and emulator messages.

For clarity, only one pair of emulator control links 208a and 208b is shown. As would be apparent to one skilled in the art, greater numbers of links can be accommodated by expanding a communications port to increase the volume and rate of data flow between the MCS and the Emulator. For example, 16 emulator control links corresponding to eight pairs of primary and secondary control links.

Emulator 200 further includes Emulated Network Data 210 representing the behavior of the DXC network 100 being emulated.

Emulator Architecture

Figure 3:
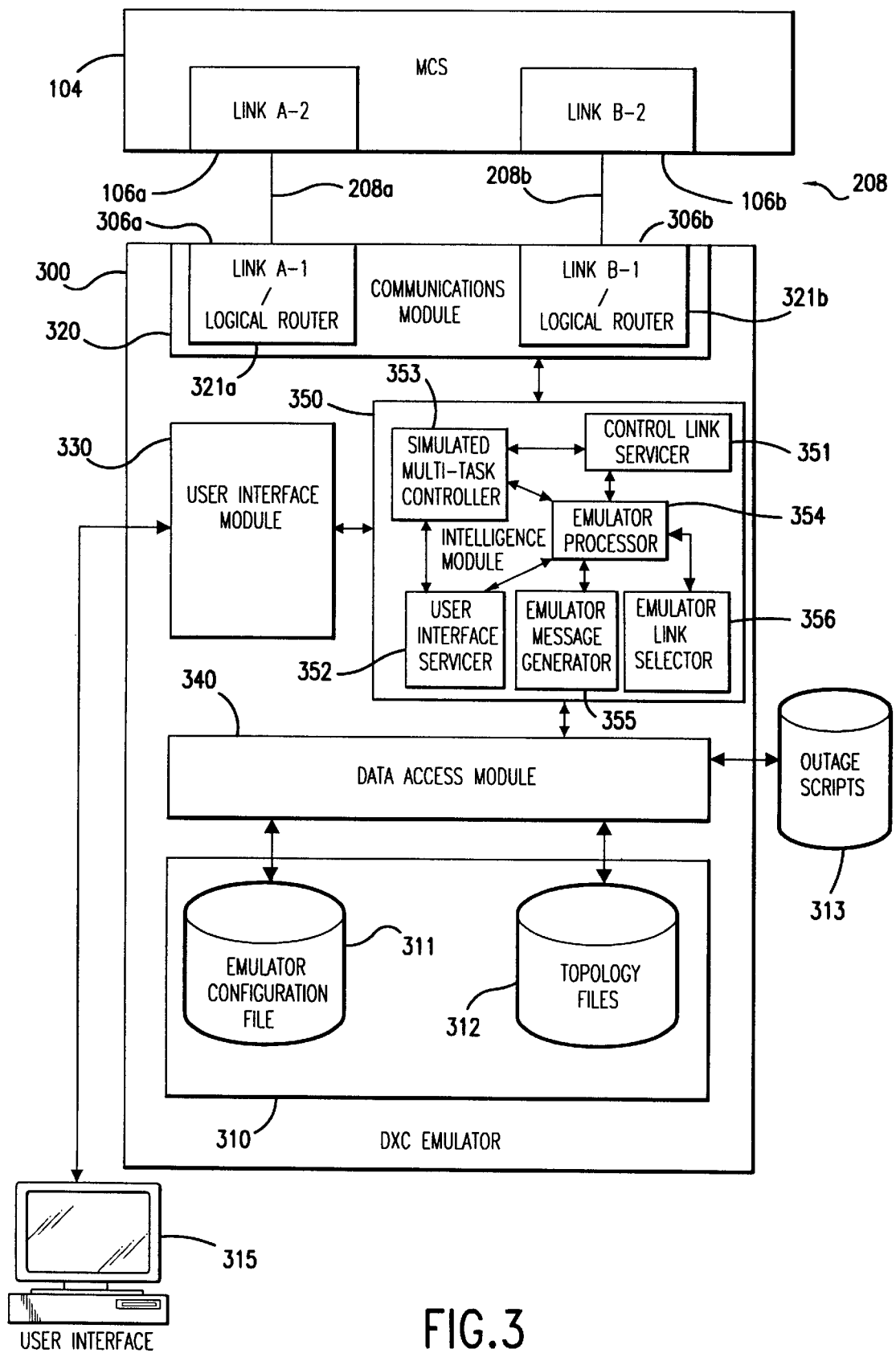
FIG. 3 is a block diagram of an DXC Network Emulator architecture according to the present invention.

Referring to FIG. 3, a block diagram of a computer system architecture for a DXC Network Emulator 300 is shown. The Emulator 300 includes four primary modules: Communications Module 320, User-Interface Module 330, Data Access Module 340, and an Intelligence Module 350. Each module 320 to 350 can be implemented as software, firmware, hardware, or any combination thereof.

Communications Module 320 manages communication between the Emulator 300 and the MCS 104. In particular, the Communications Module 320 manages the primary and secondary emulator control links 208a and 208b, monitors incoming MCS messages and outgoing emulator messages, and provides the necessary communications protocol and collision prevention. Logical routers 321a and 321b multiplex/de-multiplex messages sent and received by the Emulator 300 over the primary and secondary emulator control links 208a and 208b.

User Interface Module 330 manages a user-interface 315 through which external users can access, navigate and control the Emulator 300. For example, the user-interface 315 can consist of any standard PC I/O component such as a keyboard, mouse, and/or display screen. A graphical user-interface (GUI) can be used. An extended ASCII graphics interface encompassing an extended ASCII character set is preferred to quicken response.

Data Access Module 340 manages data access (input and/or retrieval) to a memory unit 310 and any stored outage scripts 313. In the preferred embodiment shown in FIG. 3, memory unit 310 stores a configuration data file 311 and selected topology data files 312. The configuration data file 311 contains configuration data in various data fields representing the behavior of the DXC network being emulated to test MCS 104. Parameters that are modified during Emulator 300 execution are saved to this file. An example configuration data file 311 (RTR CONF. DAT) and its constituent data fields is described further with respect to FIG. 7A.

The topology files 312 contain current and/or baseline topology data representing selected aspects of the topology of the emulated DXC network 100 to facilitate emulator navigation and control. For example, these topology data files 312 contain data pertaining to DXC nodes interconnectivity, DXC ports, and logical trunks traversing the DXC nodes. Specific examples of topology files 312 (ADJACENT.DAT, TRUNKS.DAT, AUDIT.DAT, and MASTER.DAT), and each of their data fields, as used to emulate a dynamically configured DXC 1/0 network topology at the channel level, are discussed below with respect to the Emulator operation (FIGS. 8 to 10 and 17).

Custom flat-files 311 and 312 are used which allow fast data retrieval by Data Access Module 340 averaging less than one millisecond per data return. Databases and other memory arrangements can be also used. For example, the configuration data 311 and topology data 312 can be stored in one or more database files and accessed using a standard database module and database application package. In general, memory unit 310 can consist of cache memory, main memory, magnetic storage, optical storage, disk, tape, and/or any other type of media storage device and memory hierarchy.

An Intelligence Module 350 provides the intelligent processing of the Emulator 300 and interfaces with each of the other three modules 320, 330, and 340. Intelligence module 350 includes a control link servicer module 351, a user-interface servicer module 352, a simulated multi-task controller module 353, an Emulator processor 354, an emulator message generator module 355, and an emulator link selector module 356. In a preferred embodiment, each of these modules 320 to 350 represent software applications which can be executed by a personal computer processor.

In general, Emulator 300 can be executed on any computer system. A stand-alone personal computer (PC) system is preferred, however, as such platforms are relatively inexpensive and widely available. In particular, the Emulator 300 can be run on an IBM-compatible PC with an Intel-486, 66-MHZ processor, 8MB RAM, 80MB Hard-disk drive, an OS/2 Operating system, a Super VGA monitor, and a Microsoft compatible mouse with a 7.04 driver. An Eicon X.25 communications card can be used. As would be apparent to one skilled in the art, these PC hardware requirements are illustrative. Faster processors, increased memory arrangements, and higher resolution displays can be used to improve performance. Likewise, inexpensive slower processors and hardware can be used.

The operation of each of these Emulator modules 320 to 350 to emulate a dynamically configured DXC network to test a MCS in the presence and absence of network failure (node and/or trunk failure) is now described further with reference to FIGS. 4 to 20. Flexible network topology data at the channel level is used to allow the MCS operation to be tested against different node and/or trunk connections. Various port provision arrangements for allocating channels are emulated in the topology data. Dynamic path configurations are emulated in response to MCS commands by setting up and breaking down corresponding inter-DXC trunks or channels in the topology data.

Emulator Operation

Figure 4:
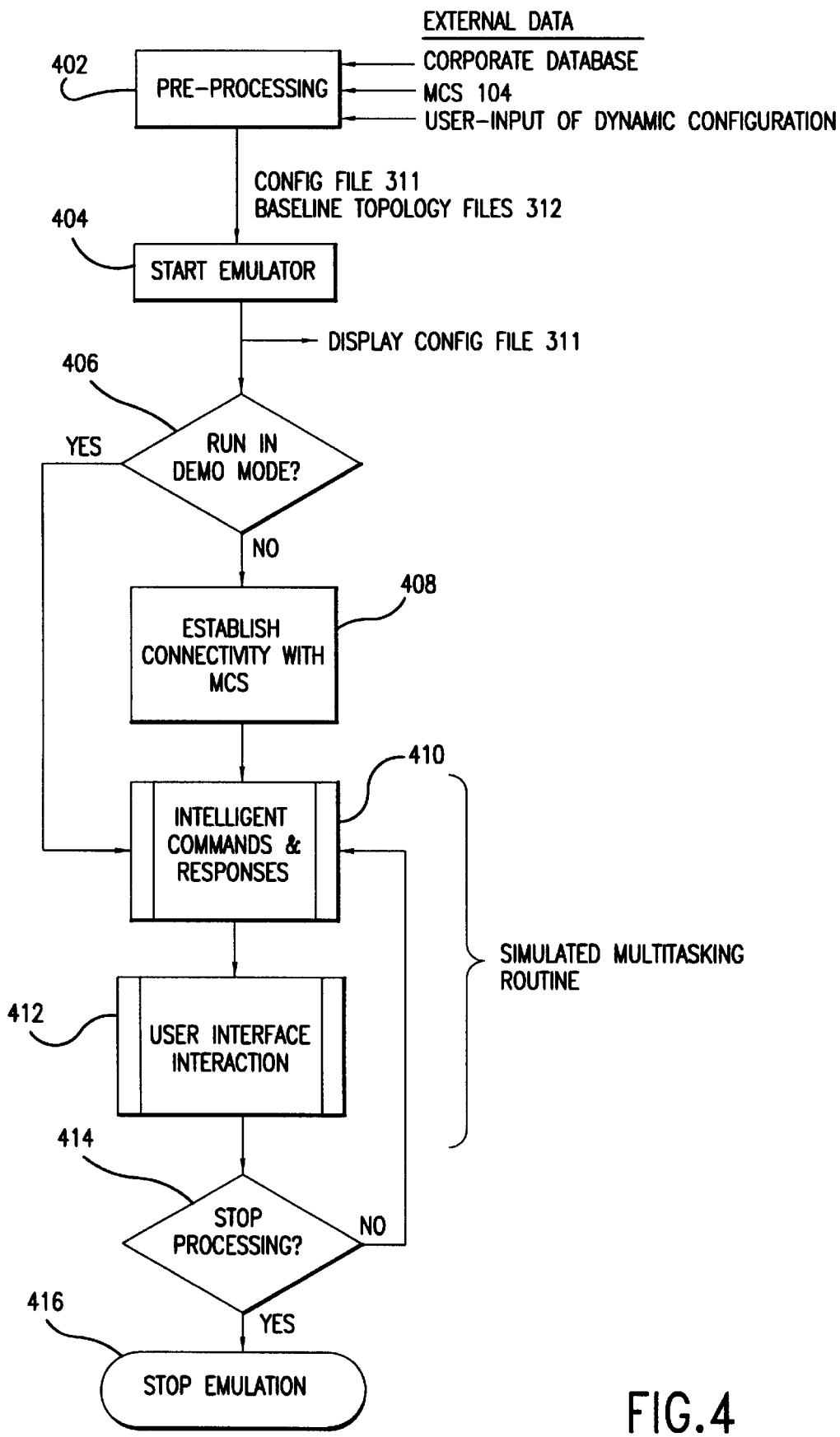
FIG. 4 is a flowchart illustrating overall DXC Network Emulator operation according to the present invention.

FIG. 4 shows a flowchart of the overall end-to-end operation of the DXC Emulator 300. This overall operation, as described herein, is run under the general control of the Intelligence Module 350, and in particular Emulator processor 354.

In step 402, Emulator processor 354 runs a pre-processing routine to create an initial network configuration data file 311 and the topology data files 312 to be used by the Emulator 300. Pre-processing routines can also be run periodically to update network configuration and baseline topology data.

In the pre-processing routine of step 402, data representing the topology of the DXC network 100 being emulated is retrieved from any of three sources: an external data source, the Monitoring and Control System 104 (assuming connectivity established), and manual input from a user through user-interface 315. For example, corporate engineering databases having master database tables are used as an external data source to simulate actual or proposed DXC networks. MCS 104 can identify how a DXC network is physically provisioned. Grow/de-grow commands, as discussed further below, can identify which ports within each DXC node are installed or equipped for link communication. Manual input from a user can be used to dynamically configure a planned network design or private line service, or to change a portion of the network for the purpose of running test cases. In one embodiment, where the topology data 312 traces trunk data through adjacent nodes, nodes and/or trunks can be added (or deleted) without detailed knowledge of intermediate site and equipment and other topology details. In this way, different combinations of network node and/or trunks are easily set up to test the MCS.

Various flat-file access routines parse and process initial data into corresponding data fields in the configuration file 311 and topology data files 312. By executing various flat-file access routines, the Emulator processor 354 draws selected data needed by the Emulator 300 from data fields of a main external database representing the complete network information and inserts the data into corresponding data fields to form the configuration file 311 and topology files 312.

In step 404, a user starts the DXC Emulator 300 to initiate operation. At the beginning of a session, the user can be presented with a display of the main configuration file 311. Two log files (communication log and a trace log) are also created, if not already created in the pre-processing routine of step 402. The communications log file (named COMMLOG.DAT) records all messages received and sent by the emulator. The message log file (named TRACELOG.DAT) records all error messages and transaction return codes created during Emulator 300 execution.

Next, the Emulator 300 offers the option to run in Demo Mode (step 406). If the user opts to run the Emulator in Demo Mode, the Emulator processor 354 proceeds to step 410. In Demo Mode, the Emulator has no connectivity to the MCS 104. In one example, the Emulator 300 operates using data from the configuration and topology data files and from user input as described below, but it does not receive or respond to commands from the MCS 104. In another example, an internal X.25 driver can be used to generate predetermined MCS-type message traffic to send to the Communication module 320 for demonstration or training purposes.

If a Demo Mode is not selected, the Emulator 300 establishes connectivity with the MCS 104 (step 408). Status messages can be sent back and forth between the MCS 104 and the communication module 320 to confirm the establishment of connectivity. Once connectivity is verified by the Emulator processor 354 and/or Communications Module 320, the Emulator can receive and respond to commands from the MCS 104 (step 410).

In step 410, the Emulator 300 receives commands from the MCS 104. MCS commands are communicated through communication module 320 to the Intelligence Module 350. MCS commands are detected and processed by Emulator processor 354 when the control-links are serviced by control link servicer 351. Emulator processor 354 works with Emulator message generator 355 and Emulator message link selector 356 to send intelligent solicited and unsolicited responses back to the MCS 104 which emulate actual responses (or lack thereof) over network node control links 108a, 108b in the DXC network 100 being emulated.

In step 412, the Emulator 300 allows for user interaction to perform tasks such as modifying the configuration of the emulated DXC nodes A to N, modifying the architecture of the DXC network 100, creating an outage, and/or clearing an outage. When user-interface servicer 353 services the user-interface 315, user inputs for navigation and control of the Emulator 300 are communicated through user-interface module 330 to the Emulator processor 354 of Intelligence Module 350. Both of these steps 410 and 412 in the operation of Emulator 300, are described further below with respect to a specific user-interface example.

Finally, when the user opts to terminate processing (step 414), operation of the Emulator 300 stops (step 416). In general, the Emulator 300 can be run 7 days a week, 24 hours a day to allow extensive MCS testing and evaluation.

Simulated Multi-Tasking

According to a further feature of the present invention, steps 410 and 412 are carried out in a pseudo-parallel fashion to simulate multi-tasking. In general, control is passed between tasks supporting step 410 and step 412 to optimize overall application execution time. The switching between tasks in steps 410 and 412 is performed sufficiently quickly as to be transparent to the user and the MCS 104. This emulates the precise behavior of an actual DXC network by allowing the communications between the Emulator 300 and the MCS 104 to occur while simulated network events are triggered by user-inputs. Simulated multi-tasking further enables the Emulator to accurately emulate the behavior of an entire DXC network consisting of hundreds of nodes (and node control links) by providing sub-second responses to a MCS under test.

Sub-second response, as used herein, means messages can be formulated by the Emulator 300 in milliseconds, i.e. approximately 0 to 13 milliseconds. The emulator messages further arrive at the MCS in less a second, and usually within milliseconds, i.e. approximately 10–100 milliseconds, depending upon X.25 communication transit delays. Sub-second response for the user-interface, as used herein, means the Emulator 300 responds to a user-input in less than a second and typically within milliseconds, i.e. 10–250 milliseconds.

The simulated multi-task controller 353 switches control between the control-link servicer 351 and the user-interface servicer 352 according to a simulated multi-tasking routine. This routine consists of four logical procedures: (1) Service control links, (2) Check user interface, (3) If user input detected, service user interface, and (4) Switch from servicing the user-interface to service control links but return to servicing the user-interface such that the switch to servicing control links is substantially imperceptible or at least not inconvenient to the user.

In a preferred embodiment, this simulated multi-tasking routine is programmed into respective program modules in the control-link servicer 351 and the user-interface server 352. See, the inventor's commonly-assigned, co-pending U.S. utility patent "Simulated Multi-Tasking on a Single- or Multi-Threaded Operating System," Ser. No. 08/641,460, by John V. McLain, Jr., filed concurrently herewith and incorporated herein by reference.

In particular, to execute step 410, simulated multi-task controller 353 switches control to control link servicer 351 to service control links 208a, 208b. During this time, Emulator processor 354 detects and responds to any incoming messages from the MCS 104. Periodically, after completion of a partial logic work unit or a complete logic work unit (i.e. within milliseconds and even nanoseconds), the simulated multi-task controller 353 checks to determine whether a user-input has been received (i.e. stored in a buffer). If a user-input has been received, the simulated multi-tasking controller switches control to user-interface servicer 352 to service user-input(s), that is, begin executing a corresponding user-interface program module.

Only one partial logical unit of work is executed at a time to service the user-input. After each partial logical unit of work is performed in the user-interface code, controller 353 returns to servicing MCS control links. In this way, the MCS 104 does not perceive the Emulator 300 to be unresponsive. A partial logic unit of work is then completed in the servicing of the MCS links before control switches back to complete execution of another user-interface code partial logic unit of work. In this way, the user does not perceive a delay by the Emulator in processing user-inputs.

For example, consider a user request that a certain screen be displayed i.e. a topology data file 312. During the painting of that screen, the simulated multi-tasking routine is executed. Simulated multi-task controller 353 transfers control from the painting of the screen after a partial logic of unit of work has been done by the user-interface servicer 352 toward servicing user-inputs. For example, after half of the screen pixel data is displayed, the simulated multi-task controller 353 switches control back to the control-link servicer 351 to service the control links. Control returns quickly to the user-interface servicer 352 to complete the painting of the screen.

The simulated multi-task controller 353 switches between tasks in such a short time interval, i.e. less than a millisecond, that external user(s) do not notice the interruption, and therefore perceive multi-tasking. In fact, this routine is performed faster than the native operation of either a single- or multi-tasking operating system (OS). Note the simulated multi-tasking routine may be run on either a single-tasking OS or a multi-tasking OS.

In sum, simulated multi-tasking is executed frequently throughout the operation of the Emulator 300, and is performed with sufficient speed (subsecond response) as to be transparent to the user and to the MCS 104. Thus, to the user it appears as if the Emulator 300 is dedicated to the tasks required in responding to the user input. To the MCS 104 it appears as if the Emulator 300 while running an application is dedicated to continuously servicing bi-directional communication over the emulator control links 208a, 208b and servicing inputs and outputs to the user-interface 315. This gives the appearance of multi-tasking in carrying out steps 410 and 412.

Responses to MCS Commands

Figure 5:
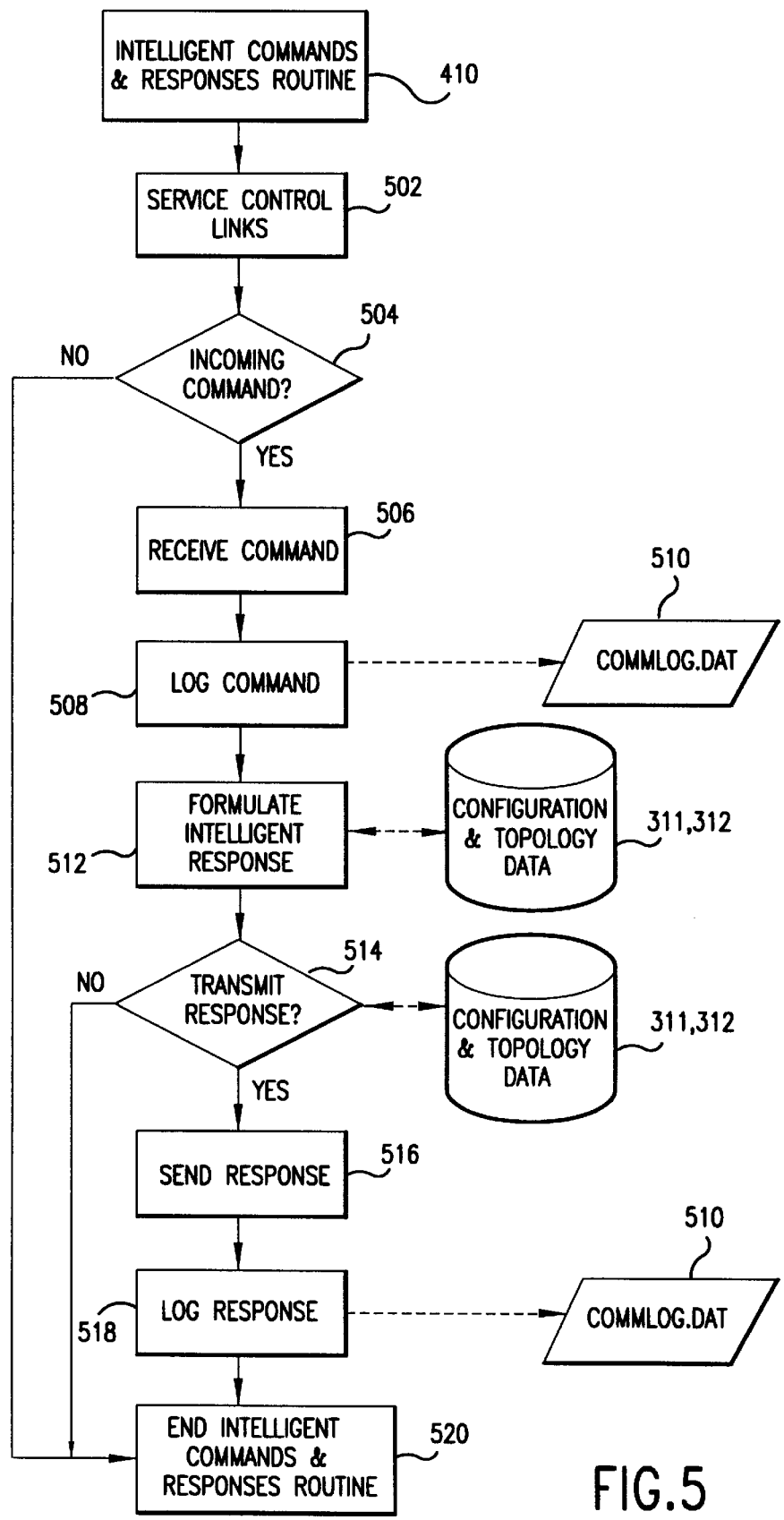
FIG. 5 is a flowchart illustrating the operation of an Intelligent Commands and Responses routine in more detail.

FIG. 5 provides a detailed breakdown of the Intelligent Commands and Responses process (step 410). In step 502, the Emulator 300 services all emulated control links 108a, 108b between each emulated DXC node A to N and the MCS 104. To emulate an actual DXC network 100, this servicing of control links 108 must be performed continuously. For example, to emulate a typical DXC 1/0 network providing enhanced private line service, communications for several hundred control links 108a, 108b must be checked in a manner that the user perceives to be simultaneous to other tasks that the Emulator 300 must perform, such as respond to user inputs and provide screen displays. To accomplish this on a standard PC running with either a multi-tasking or a single-tasking operating system, a simulated multi-tasking routine is conducted as described above.

In step 504, the Emulator processor 354 determines if any incoming commands from the MCS 104 have been found, i.e. placed in a buffer. If there are no incoming commands from the MCS 104, then this sub-process ends with step 520 and returns to the main process depicted in FIG. 4.

In step 506, Emulator processor 354 detects an incoming MCS command. The MCS command is received over an emulator control link 208, and is intended for a particular DXC 1/0 node. These commands are defined by the particular types of vendors' DXC switches in use, and can be easily programmed into the Emulator 300. For example, the RTRCONF.DAT file includes a data field DXC Revision for identifying a specific command message set suitable for each respective DXC 1/0 node depending upon the vendor. Examples of MCS commands which can be included in a message set in the preferred embodiment are:

Session Connect: Establish communications session via control link

Channel Keep Alive: Verify the target DXC is able to communicate

Initialization: Instruct the DXC as to the type of communication circuit

Alarm Audit: Solicit status of DXC alarms (per port)

Configuration Status: Solicit status of DXC node configuration

Cross Connect: Command the DXC to redirect traffic (connect/disconnect)

Grow/De-grow: Command to provision those selected ports for a DXC node which are physically installed In step 506, after receiving an incoming MCS command, the Emulator processor 354 (or communication module 320) logs the command in its communications log file, i.e. COMMLOG.DAT 510. For completeness, every command received from the MCS 104 and every response sent to the MCS 104 is logged in this file. The file is designed to wrap around itself at the end-of-file mark, so it never needs to be reset. This enables the Emulator 300 to be run continuously on a 7×24 basis, without ever having to be shut down or restarted.

In step 512, the Emulator processor 354 formulates an intelligent response to the MCS command which emulates the response or lack of response of the emulated DXC network to the incoming MCS command. In responding to MCS commands, Emulator 300 emulates both (1) the content of messages sent from the emulated DXC nodes and (2) the enabling or disabling of network node control links 108a, 108b at the respective DXC nodes.

First, Emulator message generator 355 reads the particular MCS command and identifies a corresponding response having a content identical to the content used by a DXC node in the emulated DXC network 100 to which the MCS message is addressed. Emulator message generator 355 reads the incoming MCS message and determines the DXC node to which it is addressed. Next, a message set is looked up for the particular DXC node in the configuration file 311. A specific emulator message is then generated from the message set which corresponds to the received MCS commands. The response messages that a particular DXC 1/0 node is capable of sending are specified in the message set. Thus, the content of these responses are identical to actual responses used by specific types of vendors' DXC 1/0 nodes.

These message sets for the specific DXC node vendors' release are identified for each DXC 1/0 node in the main configuration file RTRCONF.DAT, data field DXC Revision. Response messages for specific vendors' DXC nodes are thus easily programmed and updated into the Emulator configuration file 311. Examples of such response messages in a DXC vendor revision message set include:

Session connected

Confirmation that control was implemented

Confirmation that control was not implemented with reason code

Solicited status of alarm

Solicited status of node configuration.

For example, if a Session Connect message is received, Emulator message generator 355 can generate a Session Connected response. Likewise, if a Channel Keep Alive command is received, Emulator message generator 355 generates a Keep Alive response.

In addition, to respond intelligently to certain MCS queries and control commands, the emulator message generator 355 sometimes must look up or update configuration data 311 and/or topology data 312. For example, if an alarm audit message is received, the Emulator must also query the topology data file 312, to generate a response identifying the solicited port alarm status for the emulated DXC node. Similar checks are made of the configuration data 311 and/or topology data 312 when grow/de-grow, configuration status or connection audit messages are received.

When MCS commands for controlling the DXC network are received, such as reconfiguring the nodes, Emulator processor 354 further updates the configuration database 311 and/or topology data 312 to reflect the control as appropriate. The Emulator message generator 355 then responds with a confirmation, or with a reason that the control was not implemented, such as a requested connection was not in-service.

In addition, to emulating the content of DXC network node responses, the Emulator 300 further determines if this response is to be transmitted to the MCS 104 to emulate communication by the DXC network over enabled network node control links 108a, 108b (step 514). In particular, for each MCS message, emulator link selector 356 queries the configuration database 311 to determine if the primary control link 108a or the secondary control link 108b to the MCS 104 is enabled.

For example, data fields Active 1, Active 2 in the RTRCONF.DAT file 311 contain information on whether the respective emulated network control links 108a, 108b at a particular DXC node being emulated are enabled. If either link is enabled (i.e. a 1 bit is in the Active 1 or Active 2 data field), then the Emulator link selector 356 instructs the Emulator processor 354 to send the response from emulator message generator 355 to the MCS 104 (step 516).

In step 518, outgoing responses are logged in the communications file, i.e. COMMLOG.DAT 510. The sub-process ends with step 520 and returns to the main process depicted in FIG. 4.

If, in step 514, the Emulator link selector 356 determines a response cannot be transmitted, the sub-process ends with step 520 and returns to the main process depicted in FIG. 4.

Responses to User-Inputs

Emulator Control Options

FIG. 6 shows an example of the User Interface Routine (step 412) in more detail. In step 601, the user is first presented with a number of user-interface options. These options allow a user to generate user-inputs to navigate and control Emulator 300 operation (steps 602 to 616). Once user-inputs are processed through simulated multi-tasking with step 410 as described above, the User-Interface Routine ends (step 620). Each of these steps 601 to 616 is described further with respect to a user-interface example in FIGS. 7 to 20.

Figure 7B:
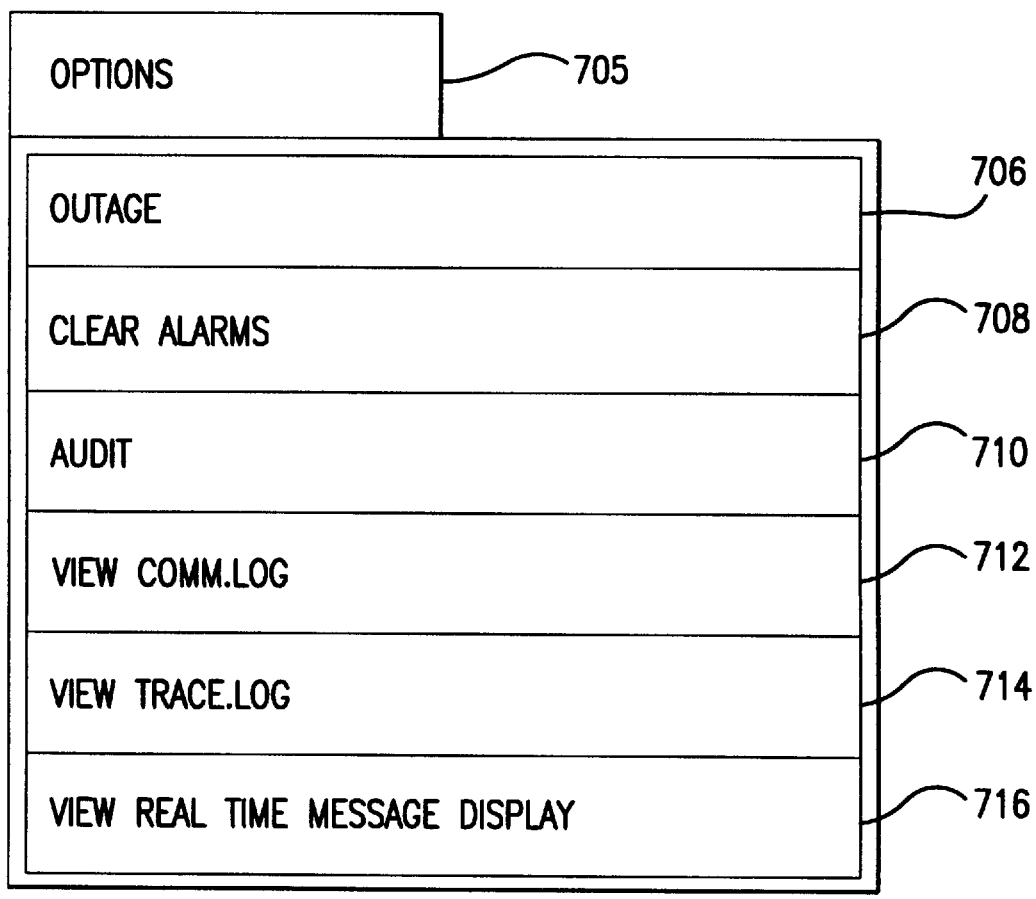
FIG. 7B is a screen display of a configuration file as in FIG. 7A further showing a pull-down menu of DXC emulator control options.

In step 602, a display of the main configuration data file 311 is provided. FIGS. 7A and 7B show an example of a display 700 of selected contents of a main configuration data file 311 representing a dynamically configured DXC 1/0 network in a preferred embodiment of the present invention. The display 700 includes a button bar having a pull-down option menu 705 and a pull-down help menu 720. To reduce the size of the display window and improve processing speed, only nine different data fields 730 are typically displayed at a time as shown in FIG. 7A. Scroll bars 735, 736 allow a user to scroll through the displayed data file 311.

Dynamic Node Configuration

Through the user-interface 315, the user can input and/or modify any of the displayed configuration data in one or more of the data fields 730. In this way, the user can dynamically configure the DXC nodes and their interconnection in the DXC network being emulated (step 602). For example, when a DXC 1/0 network 100 is emulated by a configuration data file 311 as shown in FIG. 7A, these modifications can include: enabling/disabling control links, enabling/disabling entire DXC nodes, enabling/disabling certain DXC ports, enabling/disabling interconnecting equipment, trunks, or sites, changing DXC node i.d., changing all response codes given by a particular DXC, corrupting response code data, clearing alarm conditions, changing message sets (changing vendor model type and/or model revision of a DXC 1/0 node). These changes can be saved as an update to the configuration data file 311 or under a different configuration filename, thereby permitting the user to load a particular configuration at any time. This allows the user to run test scenarios and perform assessments on certain network designs.

At the user-interface 315, standard point-click type of mouse and cursor movements (such as clicking and double-clicking) are used to navigate and dynamically input the above DXC node configuration modifications into the data fields 730. For example, the sequence number data field (Seq. Num.) indicates an internal emulator count of the DXC nodes being emulated. Highlighting a row indicates a selected DXC Node.

In FIG. 7A, row 1 has been highlighted indicating the DXC node having a seq.num. 1 is selected. The Transmit field is ON indicating the DXC node 1 emulates a transmitting DXC node which responds to MCS messages and sends unsolicited messages such as alarms. Moving a cursor to this location and clicking a mouse button enables a user to toggle the Transmit field data to OFF, thereby, simulating a completely off-line DXC node. This is useful to observe the polling behavior of the MCS 104.

Link A (ACS12345678) and Link B (ACS12345678) data fields each have an up arrow indicating that the primary and secondary network control links 108a, 108b being emulated are both enabled for the DXC node 1. The column header (ACS12345678) shows what type of information is communicated over each of the eleven virtual circuits (supporting 22 communication sessions per link) in the X.25 protocol: three binary links (A (Alarm), C (Command/Control), and S (Status)) and eight Man-Machine Interface virtual links 1 to 8. The individual circuits are either logically or physically connected to the MCS (indicated by an "O") or not logically or physically connected (indicated by a "1" or a vertical bar) depending upon the connection of the Emulator 300 to the MCS 104. Clicking or double-clicking either of the Link A (ACS12345678) or Link B (ACS12345678) fields enables or disables that respective network node control link being emulated.

Separate Link A and Link B fields (not shown) also indicate whether the respective simulated network control links for each DXC node are enabled. These Link A and Link B fields are set during pre-programming and updated in response to an outage script or dynamic user-inputs.

Clicking at a Cmd RC receive field allows the user to set the type of Response Code that will be returned for all MCS messages and commands received for the selected DXC node 1. The response code can be entered by the user or selected from a separate pop-up display window displaying the available Response code choices. The following Response Code Table lists an example of a set of response codes and their descriptions which can be used:

| Code | Description |
| --- | --- |
| 0 | Complete |
| 1 | Deny |
| 2 | Unequipped deny |
| 3 | Equipped Deny |
| 4 | Access deny |
| 5 | Input error |
| 6 | Not accessed |
| 7 | Redundant or re-directed Circuit complete |
| 14 | Terminal connected to different port |
| 16 | Port in failed state (redundant) |
| 17 | Denied with code |
| 18 | Port is out of service |
| 19 | Redundant or re-directed circuit deny |
| 20 | Input range is wrong |
| 22 | Terminal not connected to origination |
| 23 | Port is under test |
| 26 | Channel is looped |
| 27 | Current state is monitor |
| 28 | Cross connect was disconnected |
| 33 | Request queued for execution |
| 45 | Condition deny |
| 49 | UC failure |
| 50 | Roll and swap deny |
| 51 | Roll and swap undeny |
| 52 | Deny request - roll in progress |
| 55 | Database error deny |
| 59 | Unmapped deny for TDIS/ODIS cmds (two-way or one-way disconnect) |
| 60 | Deny due to maintenance condition |

If the response code is set to "0", the Emulator 300 automatically determines the appropriate response code for an MCS message based on the corresponding message set data. Otherwise, the Emulator 300 returns the users-specified response code message. Additional response codes can be used depending upon the behavior of the DXC nodes being emulated.

Changing a Corrupt Response field from "NO" to "YES" allows the user to corrupt data in all response messages sent for the selected DXC node. This allows the Emulator 300 to further test the response of the polling MCS 104 when receiving bad data from a DXC node.

The specific messages sent by a DXC node in response to MCS messages vary depending upon the DXC vendor, model, and revision. The Message Set Data field (now shown) identifies a particular response message set for a specific DXC revision. The number of message sets varies depending upon the different types of DXC nodes and revisions being emulated. The message set values for this data field are typically set for each DXC node during pre-programming. A dynamic configuration capability allowing values to be entered by the user or selected from a separate pop-up display window listing the available Message Set value choices can be provided.

Dynamic node configuration is also provided for selecting and changing data values found in the DXC Node and DTE data fields. Changing the DXC Node (or Node ID) data field value allows the user to change the node identification number of the selected DXC node in the emulated DXC network 100. The DTE data can be changed to ensure that the DTE address used by the Emulator 300 for a selected DXC node matches that the DTE address on the MCS 104 computer, i.e. a local or remote VAX address.

Two other configuration data fields 730, Card and DXC type, are preferably set during pre-programming as they are not often changed during a particular MCS test run. The Card value identifies another specific communications card through which the Communications module 320 sends messages for a selected DXC node. When multiple communication cards are used to communicate with the MCS 104, the DXC nodes are divided between the communication cards for load balancing and to improve emulator response. The DXC type field identifies the type of DXC node, i.e. DXC 3/3, DXC 3/1, and DXC 1/0 node. Changing the DXC type data field value allows the user to simulate a different DXC node type (i.e. DXC 1/0). Of course, it might be necessary to propagate this change in DXC type to other data fields such as the Message Set.

Figure 8:
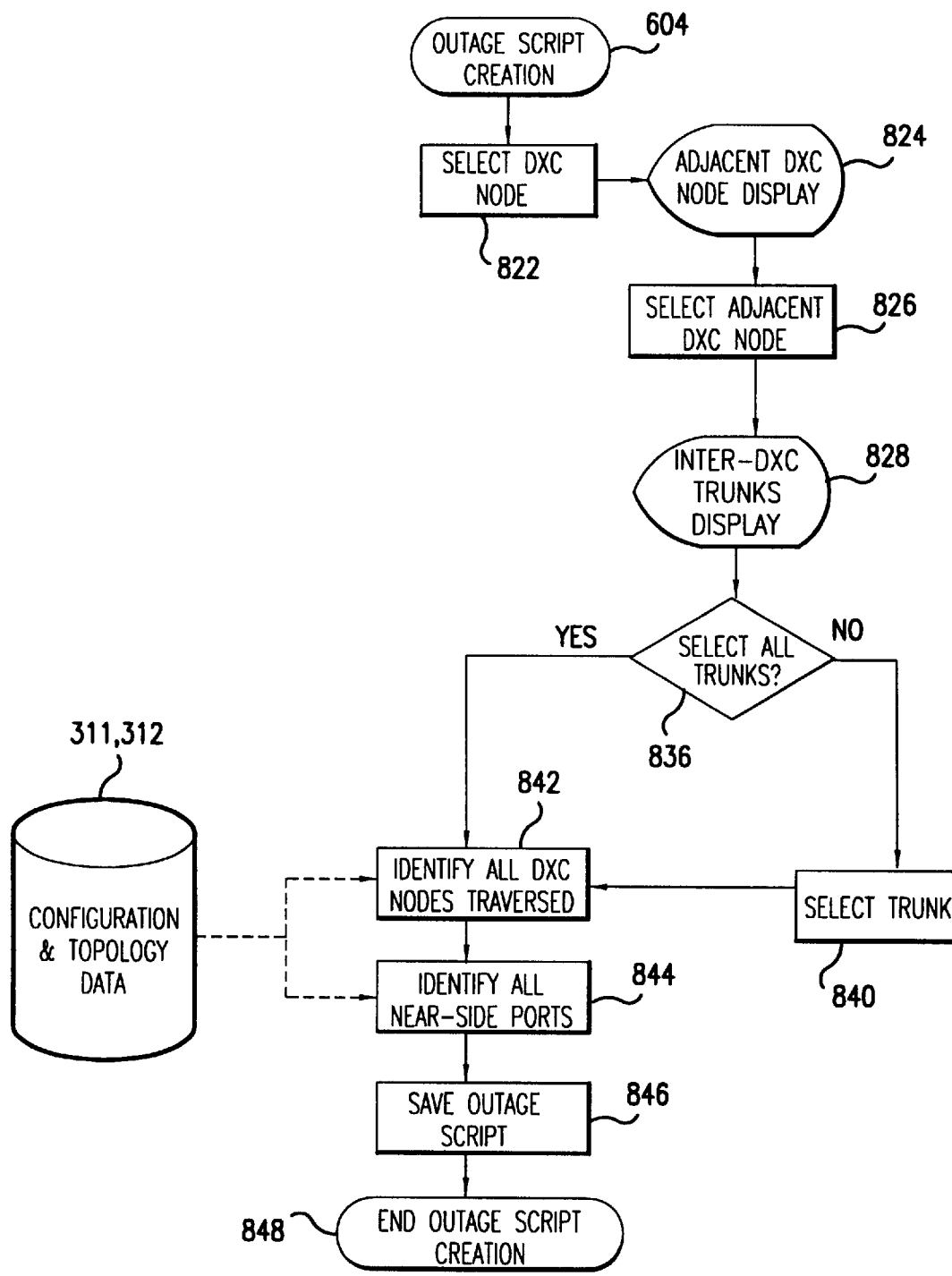
FIG. 8 is flowchart illustrating the operation of one DXC emulator control option for creating an outage script emulating a network outage.
Figure 10:
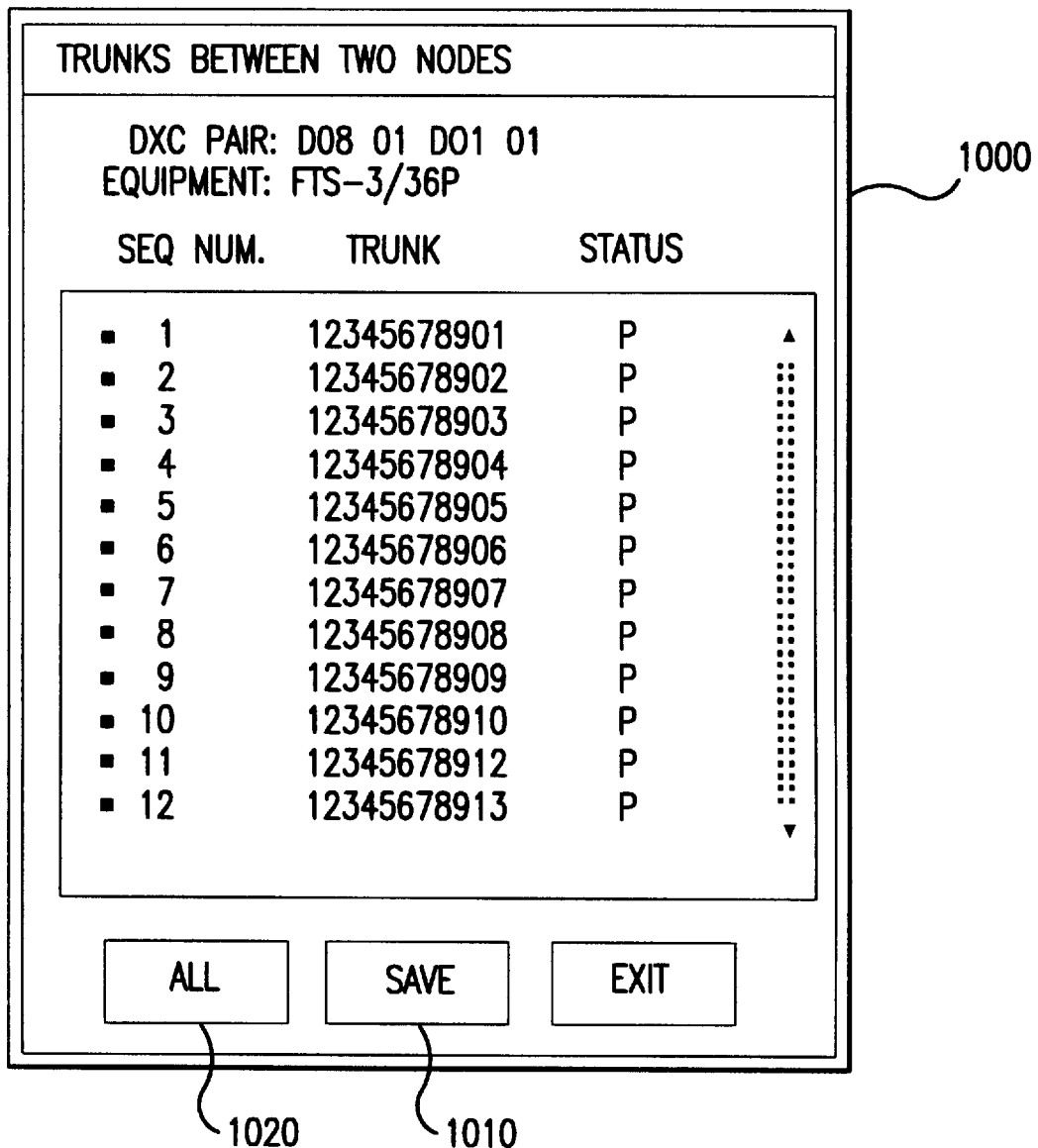

Finally, a user can select the DXC name data field to enter or change the DXC name. In a further preferred example of the present invention, clicking the cursor on the DXC name causes a series of windows to be displayed. These windows allow a user to identify and select adjacent DXC nodes and trunks to emulate the presence and absence of a network failure. See FIGS. 9 to 10. These displays are described with respect to the creation of an outage script as shown in FIG. 8.

Outage Emulation

Outage Script Creation

In step 604, the user can create an outage script file 313 that specifies an outage condition. This file can then be run (as specified later in reference to step 606) to emulate the network's response to an outage condition. This same file can also be run, subsequent to an outage emulation and under a normalization option (step 608), to normalize the network and clear the alarms that were triggered in response to the outage.

Referring to FIG. 8, in step 822, the user selects a DXC node from the main configuration data 311. This can be done by selecting a DXC name data field from a configuration data display 700 shown in FIG. 7A.

In step 824, the user is then presented with a display 900 of all DXC 3/3 nodes that are adjacent to the selected node as shown in FIG. 9. The adjacent node data composing screen display 900 are quickly obtained from the topology data 312, i.e. an ADJACENT.DAT file generated during pre-processing routine 402 as described earlier. For example, the ADJACENT.DAT file can have a hub DXC, Adjacent DXC, and Node ID data fields to correlate hub DXC node data with associated adjacent DXC nodes according to the specific network topology being emulated.

In step 826, the user selects an adjacent DXC node as indicated by the highlight 910. The user is then presented with a display 1000 (FIG. 10) of all logical trunks (or channels) between two adjacent DXC nodes, as indicated in step 828. In steps 836 and 840, the user selects a one, several, or all logical trunks between the two DXC nodes to simulate a network failure along the logical trunks (traffic bearing or non-traffic bearing). A check mark is displayed next to any disabled logical trunk; a square indicates functioning logical trunks. Pressing ALL button 1020 automatically marks all logical trunks between the selected DXC nodes as disabled.

Once disabled logical trunks have been identified, an outage script can be created by pressing the save button 1010. The process then proceeds to steps 842 to 846 to formulate an outage script file corresponding to the selected disabled trunks between two adjacent DXC nodes.

In step 842, the Emulator processor 354 queries configuration data 311 and/or topology data 312 with the selected disabled trunks to identify all DXC 1/0nodes that the selected trunks traverse. Any pre-processed topology file 312 can be accessed which correlates trunks and nodes directly connected to the trunks, such as the TRUNKS.DAT for adjacent DXC nodes. A master topology file, i.e. MASTER.DAT file, can also be accessed which lists all available topology data extracted by inter-DXC trunk number including equipment status (Assigned, Open, Patched, Restoration), DXC Name, site code, equipment name, port (port numbers), and port status relative to a break (i.e. near-side port, far-side port, or break).

Then in step 844, the Emulator processor 354 identifies all the near-side ports that are used by each DXC node to support the selected trunks. Again, this data is most quickly obtained from Topology data 312, such as a master system file (MASTER.DAT) or a custom DXC node and near-side port file. In this preferred example, only the near-side ports of each supporting DXC 1/0 node will generate an alarm in response to the outage. Assuming that each DXC node has two ports for each logical trunk (one incoming and one outgoing), the near-side port is defined as the port facing the path towards the point of outage.

When all trunks have been selected and all impacted near-side ports of DXC nodes have been identified, the outage script is saved in step 846. This 'script' is a file that indicates which link in the network has been broken, which DXC ports (e.g. the near-side ports facing any selected equipment and/or logical trunk failure) will generate alarms, and any corresponding alarm messages. For example, an outage script file can be a data file having respectively data fields for DXC name, DXC port, Trunk and Alarm message data. Alarm messages can be provided in human-readable or non-human readable format.

Figure 14:
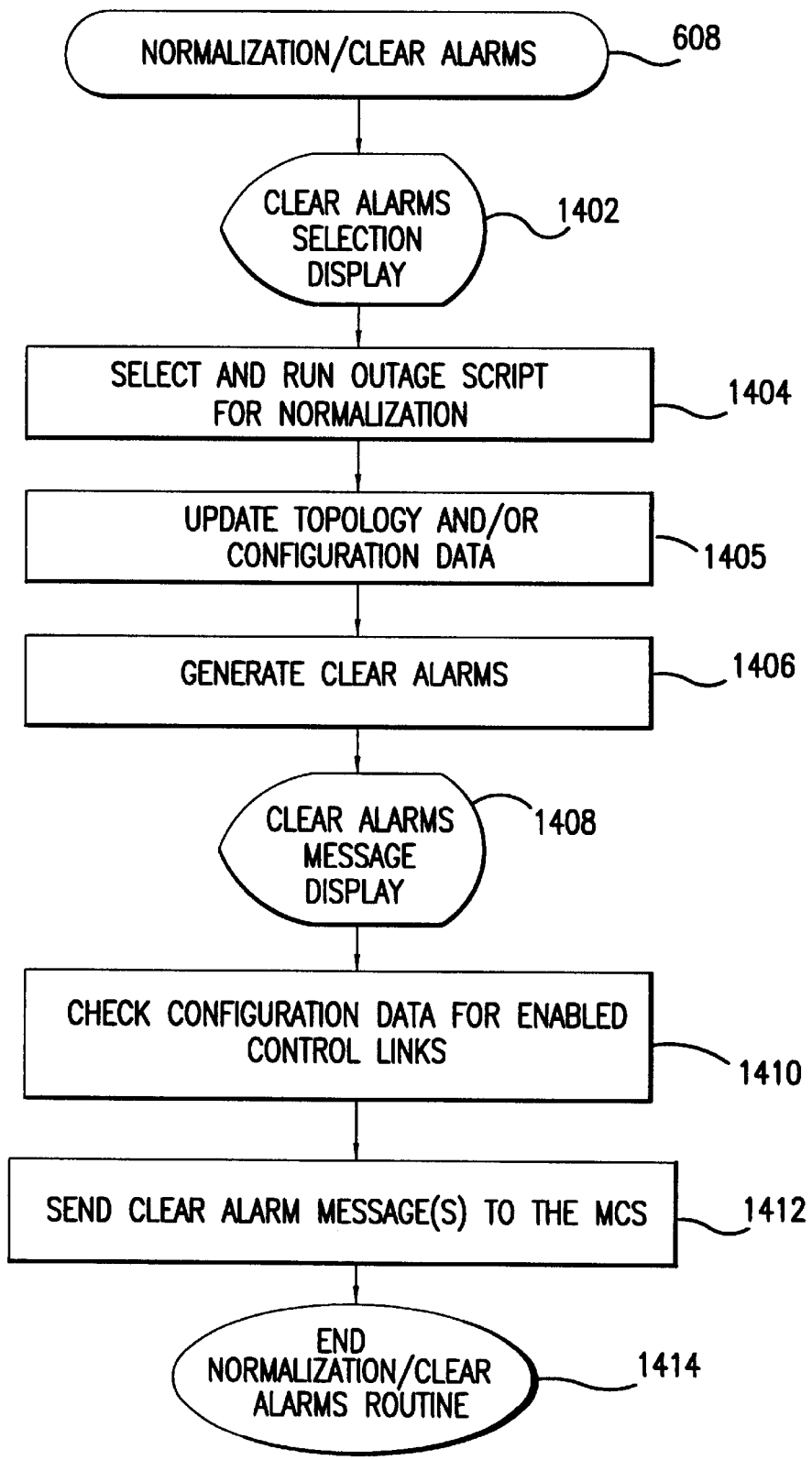
FIG. 14 is flowchart illustrating the operation of another DXC emulator control option for clearing alarms to emulate a network normalization.

Once the outage script has been saved, the process of Outage Script Creation ends (step 848) and returns to the User Interface process in FIG. 6. This outage script can be selected later during Emulator operation to simulate the corresponding outage condition (FIG. 11) or to normalize the emulated DXC network (FIG. 14). Normalization is the process of removing the outage and clearing alarms that were triggered by the outage condition.

Outage Script Selection

Referring back to FIGS. 6 and 7B, other emulator control options (steps 606–616) can be input by a user through the pull-down Options menu 705. Each of the steps 606–616 is described in sequence with respect to a corresponding pull-down option 706–716.

Figure 11:
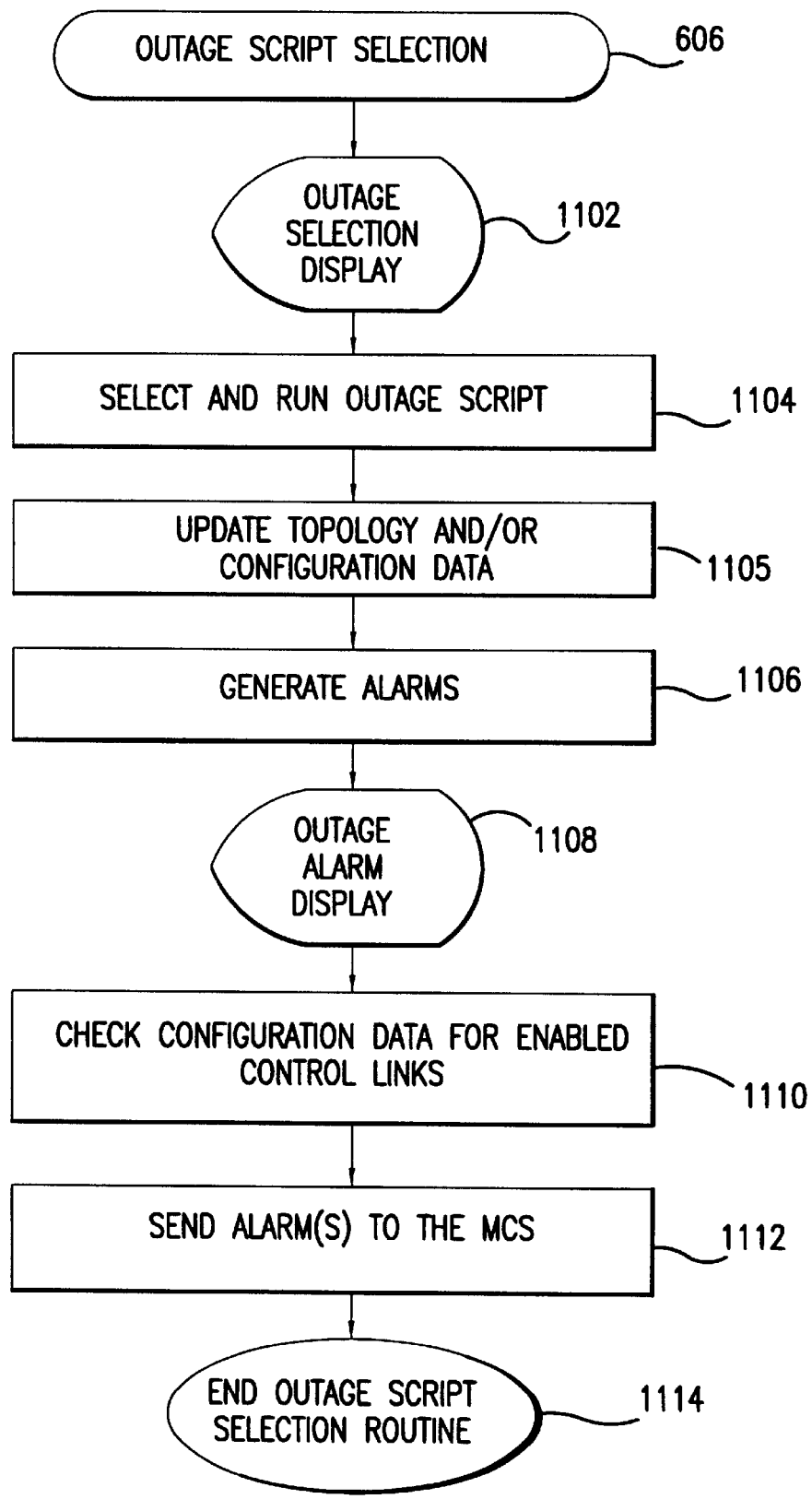
FIG. 11 is flowchart illustrating the operation of another DXC emulator control option for selecting an outage script to emulate a network outage.
Figure 12:
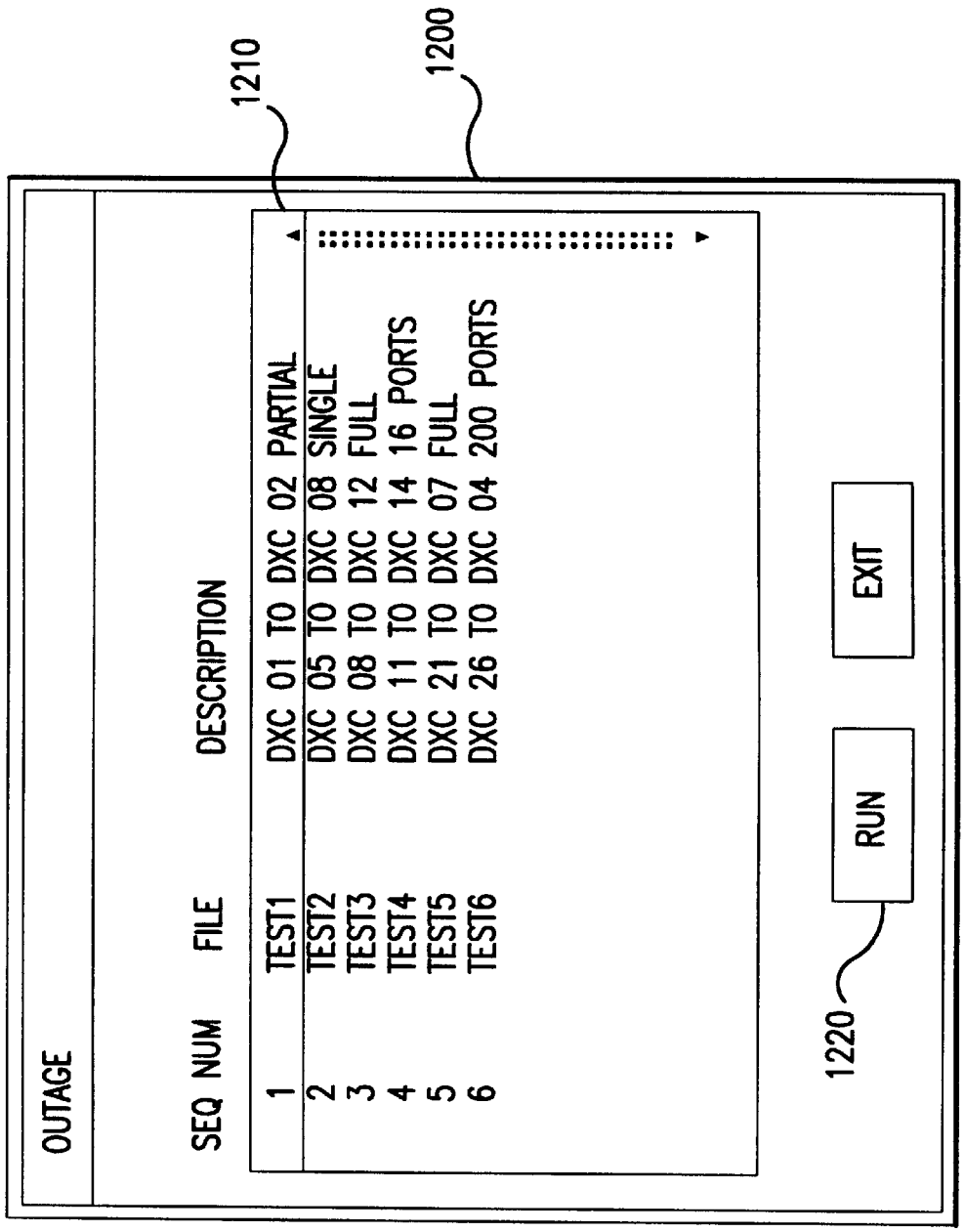
FIGS. 12 and 13 are screen displays used in an example of the present invention for selecting and executing an outage script according to the process of FIG. 11.
Figure 13:
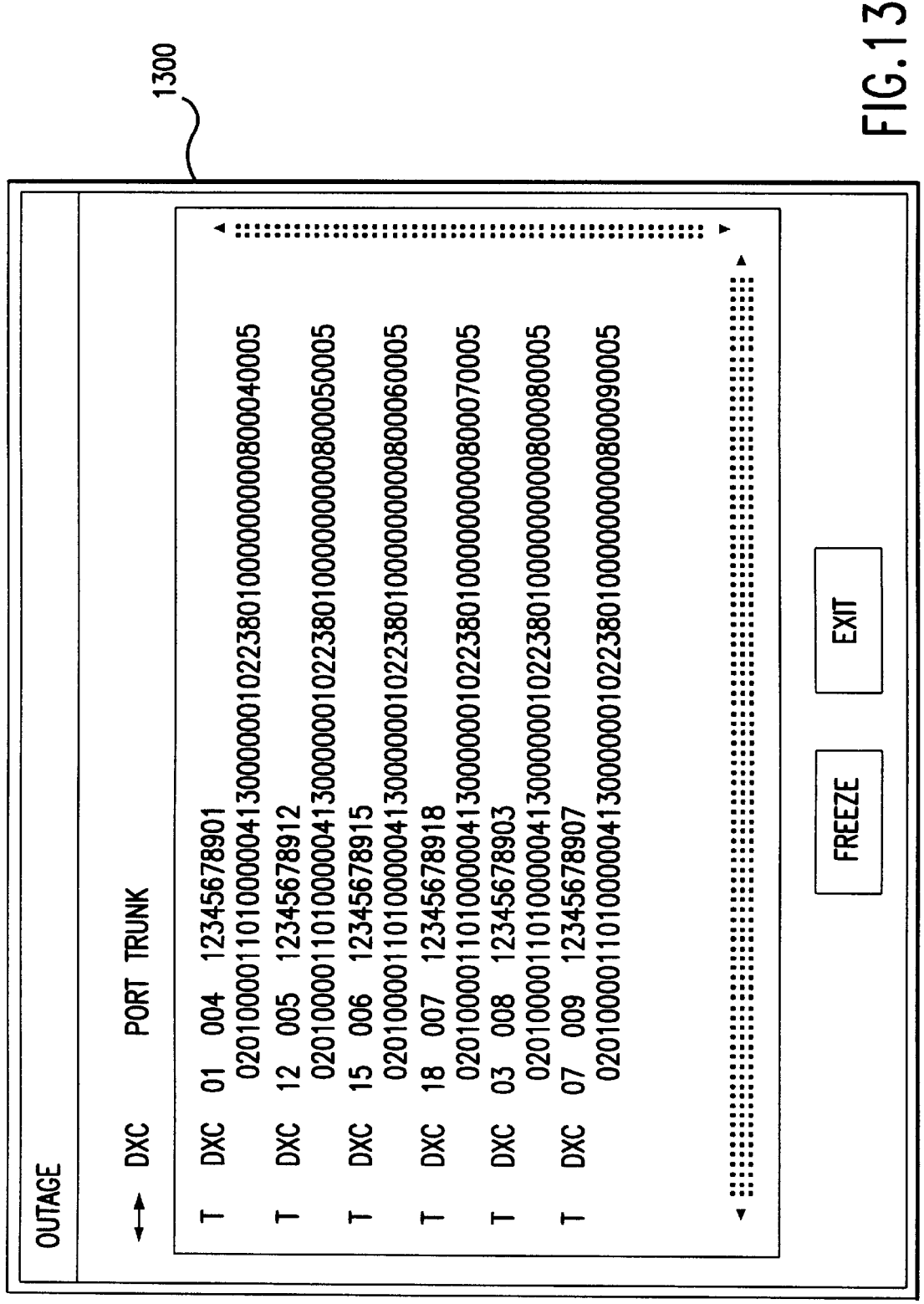

During emulator operation the user can simulate a DXC network failure to test the MCS 104 by selecting an OUTAGE option (step 606, pull-down option 706). FIG. 11 shows the routine triggered by selecting the outage control option. FIG. 12 shows an example outage selection display 1200 which lists all available outage scripts (step 1102). FIG. 13 shows a selected outage script display 1300.

In step 1104, the user selects a script, i.e. the highlighted outage script 1210, and runs the script by pressing the Run button 1220. Emulator processor 354 then executes the selected outage script file. The configuration data 311 and/or topology data 312 is updated, where necessary, to identify DXC nodes, ports, trunks, or control links impacted by the outage (step 1105). In this way, further Emulator operations in steps 410 and 412 will access topology data 312 and configuration data 311 which has been updated to reflect the outage condition saved in the selected outage script file. Thus, the Emulator 300 emulates DXC network behavior to test an MCS 104 during an outage condition as well.

Alarm messages contained in the outage script file are generated (step 1106). These alarm messages, can be output to an outage script display 1300 as they are processed (step 1108). The outage script display 1300 shows the following for each alarm: the selected DXC name, port, trunk showing an alarm, and the alarm message data. The alarm messages can be provided in human-readable or non-human readable format. In one human-considerate feature of the present invention, binary alarm message data is converted to ASCII characters (i.e. groups of lower and higher order bits are converted into respective ASCII characters for display). Hundreds or even thousands alarm messages are sometimes associated with an outage. Simulated multi-tasking allows MSC commands to be serviced while alarm message are executed.

In step 1112, these alarm messages are then sent by the Emulator processor 354 to the MSC 104 for each DXC node near-side port identified in the outage script. The alarm messages are sent unsolicited to the MCS 104 or solicited in the case of an alarm audit. Before alarms are sent to the MCS 104, emulator link selector 356 further checks the current configuration data 311 for corresponding DXC nodes, i.e. Transmit, LinkA, LinkB, Active 1, and/or Active 2 data fields (step 1110). In this way, alarm messages representing trunk and/or equipment failure are only sent for transmitting DXC nodes having enabled control links A and/or B (108a, 108b).

The Outage script selection 606 routine ends in step 1114 and returns to step 620.

Normalization/Clear Alarms

In step 608, the user can emulate normalization of a DXC network. This routine 608 for normalizing the emulated DXC network, or in other words, clearing the alarms, can be initiated by selecting the CLEAR ALARM option 708 from the pull-down menu 705. FIG. 14 shows the routine 608 triggered by selecting the outage control option.

Figure 15:
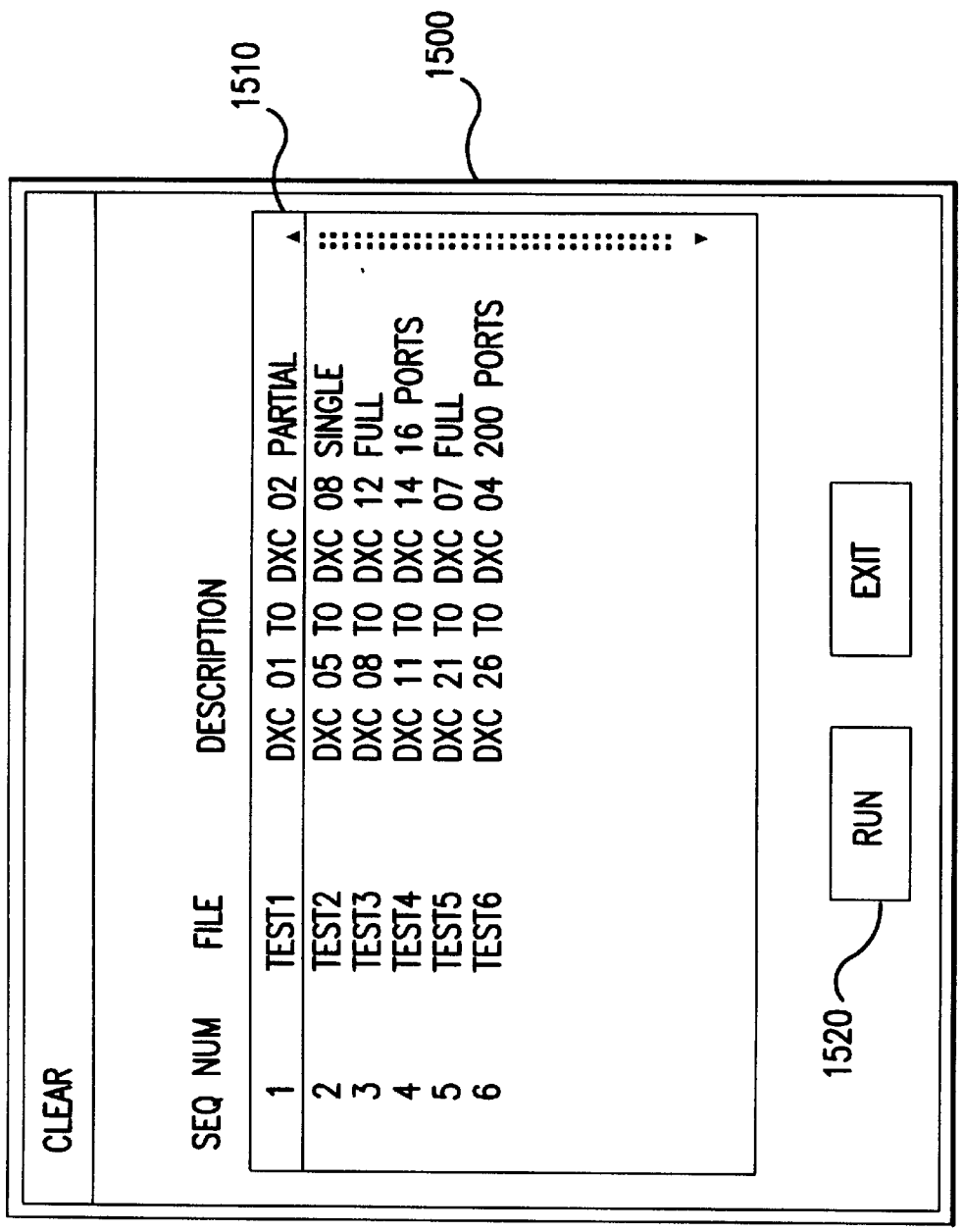
FIGS. 15 and 16 are screen displays used in an example of the present invention for clearing alarms according to the process of FIG. 14.
Figure 16:
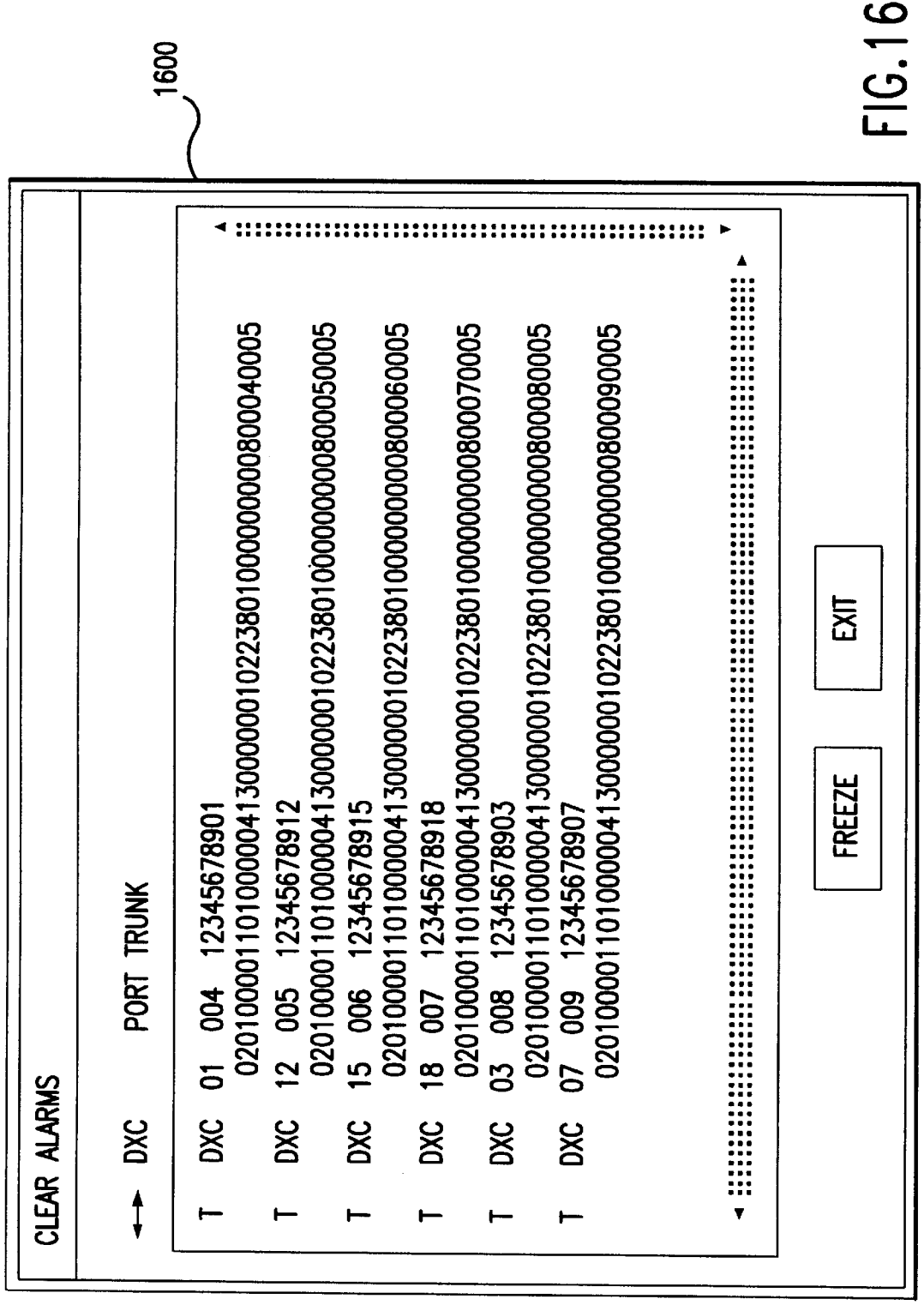

As shown in the FIG. 15 example, a Clear Alarms selection display 1700 lists all available outage scripts (step 1402). In step 1404, the user selects a script, i.e. the highlighted outage script 1510, and runs the script by pressing the Run button 1520.

Emulator processor 354 then executes the selected outage script file. In step 1405, configuration data 311 and/or topology data 312 is updated where necessary to clear alarms and enable any disabled nodes, ports, trunks, and/or control links associated with the outage. In this way, further Emulator operations in steps 410 and 412 will access topology data 312 and configuration data 311 which is updated to reflect the normalization of an outage condition imparted from the selected outage script file.

In step 1406, clear alarm messages drawn from the outage script file are generated. These clear alarm messages can be output to an outage alarm display 1800 as they are processed (step 1408). The display 1600 (FIG. 16) shows the following for each cleared alarm: the selected DXC name, port, trunk showing a cleared alarm, and the cleared alarm message data. Again, simulated multi-tasking allows MCS commands to be serviced transparently in a pseudo-parallel fashion during execution of a normalization control option 708.

Clear alarm messages are then sent by the Emulator processor 354 to the MCS 104 for each DXC node near-side port identified in the selected outage script. The alarm message are sent unsolicited to the MCS 104 or solicited in the case of an alarm audit by the MCS (step 1412). Before alarms are sent to the MCS 104, emulator link selector 356 further checks the current configuration data 311 for corresponding DXC nodes, i.e. Transmit, LinkA, LinkB, Active 1, and/or Active 2 data fields (step 1410). In this way, clear alarm messages representing trunk and/or equipment normalization are only sent for transmitting DXC nodes having enabled control links A and/or B (108a, 108b). The Clear Alarms selection 608 routine then ends in step 1414 and returns to step 620.

Other Control Options

Referring back to FIG. 6, four other emulator control options can be input: audit (step 610), view communication log (step 612), view trace log (step 614), and view Real-Time message display (step 616). In the user-interface example shown in FIG. 7B, the control options can be input by selecting respective options 710–716 in the pull-down menu 705.

As shown in FIG. 17A, the Audit display window 1700 is displayed when the Audit option 710 is selected (step 610). This display allows the user to see the current set of port parameters that the Emulator 300 is using to simulate each DXC node (identified by a site code, i.e. D01 01), including communication port and cross-connect port numbers, port provision data (start channel number and total number of channels provisioned for the port), X.25 status, alarm type, and cross-connect configuration status. The port provision data is further described below with respect to FIG. 17B.

The port data composing screen display 1700 is quickly obtained from the topology data 312, i.e. data fields in the AUDIT.DAT file generated during preprocessing routine 402 as described earlier. These data values can be dynamically changed through selections made at the user-interface 315 to more fully stress the MCS 104 with different combinations of data and test case scenarios. The following Table lists the data fields and their descriptions for the example audit data file displayed in FIG. 17A:

| Data Field | Description |
|---|---|
| Port | Number of the communication port on the selected DXC |
| XPort | Number of the communication port cross-connected to the port identified in the Port data field |
| StartCN | Starting Number of provisioned Channel |
| TotalNC | Total number of provisioned channels |
| Status | Original status of the X.25 virtual circuit |
| AlmType | Type of alarm generated in the event of a trunk or equipment failure (e.g. a fiber break) |
| CfgStatus | Status of configuration of the connected port (i.e. equipped or not equipped) |

According to a further option allowing manual generation of alarms, one or more of the DXC node ports can be manually-selected to audit alarm generation. A Send data field can be added to track selected ports. Pressing a transmit alarm button (not shown) then generates alarm messages for all ports marked for sending unsolicited alarms. Broadcast ports and other node port information can be also added depending upon a particular network application.

As is well-known, each DXC port can support respective one or more channels. Likewise, each cross-connect port can support its own corresponding one or more channels. When node ports are provisioned, or in other words equipped with links, selected channels of one communication port are cross-connected through the DXC node to corresponding channels of a cross-connect port. In response to user-inputs and/or MCS grow/de-grow commands, the Emulator 300 updates topology data 312, i.e. AUDIT.DAT file, to emulate different arrangements of provisioned channels in the ports for testing MCS response.

FIG. 17B further shows an example of the Audit Database Cross Connected Channels display screen 1750. The display screen 1750 pops up when either the Start Channel Number or Total Channel Number field is clicked (1710) for a selected port (0003) and cross-connect port (0044). This screen 1750 shows how the communication and cross-connect ports (0003, 0044) are provisioned and which channels out of a total of 24 channels (1–24) are cross-connected.

Consider the port provision data for port 0003. Channels 1 to 2 and 11 to 19 are marked XX to signify that these channels have not been provisioned, i.e. not equipped for links, and thus are unavailable for any port cross-connection. Channels 3 to 10 of port 0033 are cross-connected with channel numbers 14 to 21 of port 0044, respectively. This reflects the information in row 1710 identifying a start channel number of 3 and a total of eight provisioned channels. Likewise, channels 20 to 24 of port 0003 cross-connect to channels 3 to 7 respectively of port 0044 (see row 1712).

In this example, all of the 24 channels of port 0003 are either not provisioned (marked XX) or are provisioned and cross-connected to port 0044 channels. In general, however, a port can have channels crossed to one or more other cross-connect ports. For example, channels 10 to 12 of port 044 as indicated by an underscore are physically provisioned, but are cross-connected to a port other than port 0003. A user could click on row 1714 corresponding to the cross-connect port 0044 to determine the port number (i.e. port 0004) for these provisioned channels for the port 0044.

The View Communication Log display window 1800 is displayed when the View Comm. Log option 712 is selected (step 612). This display allows the user to see the COMMLOG.DAT file 510 during emulator operation for monitoring emulator and/or MCS performance and trouble-shooting. This communication log contains in temporal sequence all incoming MCS messages and out-going Emulator messages. In the example shown in FIG. 18, the following information is kept for each message: time which message was logged, DXC name, Port (port number on which the message was sent or received), Ckt (type of message sent i.e. unknown, alarm, control/command, audit, MMI), C/R (C represents incoming MCS command; R represents outgoing response), and the actual message.

Figure 19:
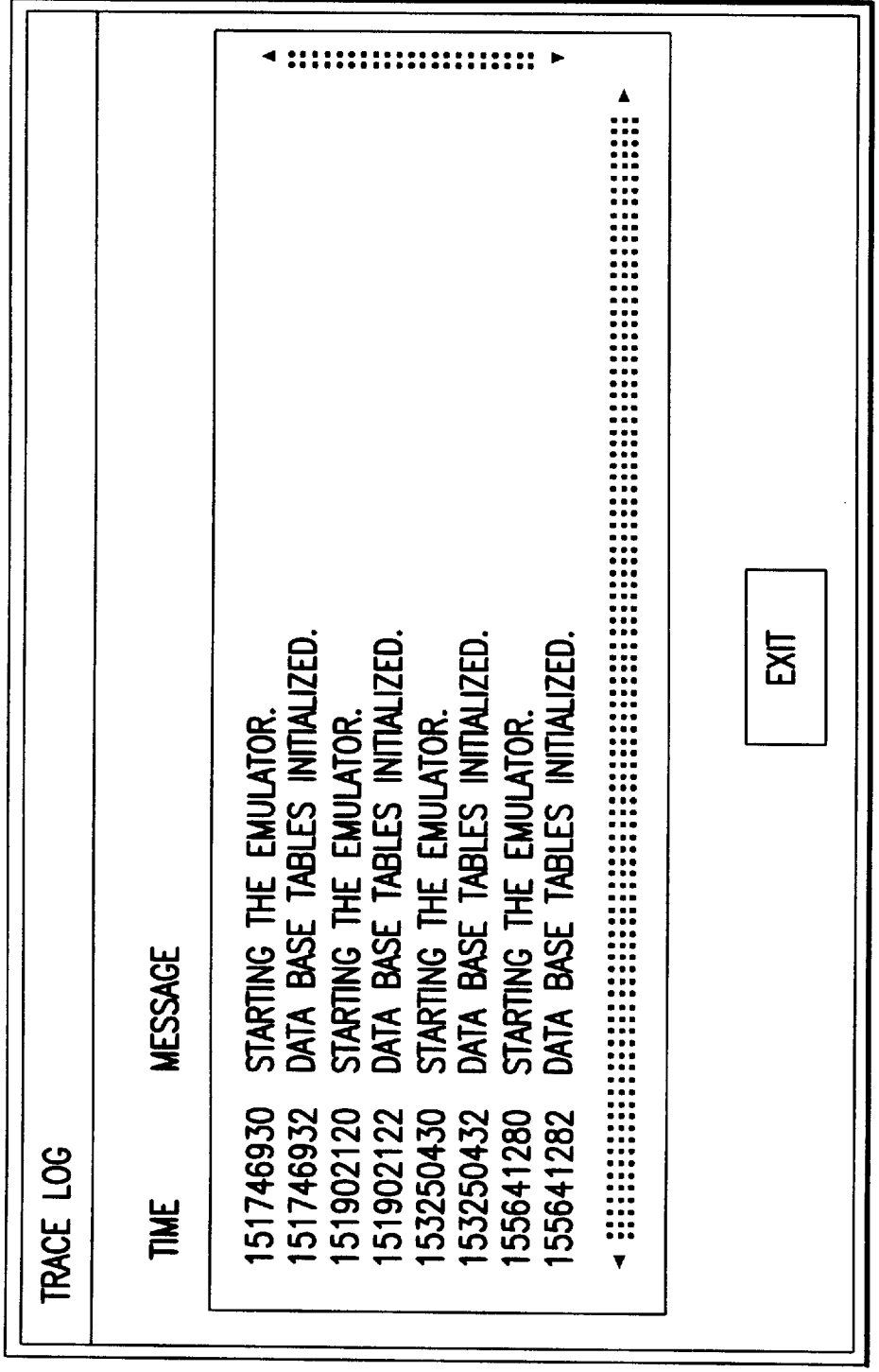

Similarly, the View Trace Log display window 1900, as shown in FIG. 19, is displayed when the View Trace Log option 714 is selected (step 614). This display allows the user to see a trace log, i.e. a TRACELOG.DAT file, during emulator operation for monitoring emulator and/or MCS performance and trouble-shooting. The trace log contains in temporal sequence messages written to the trace log by the Emulator during program execution. The time at which messages are logged is recorded in milliseconds.

Figure 20:
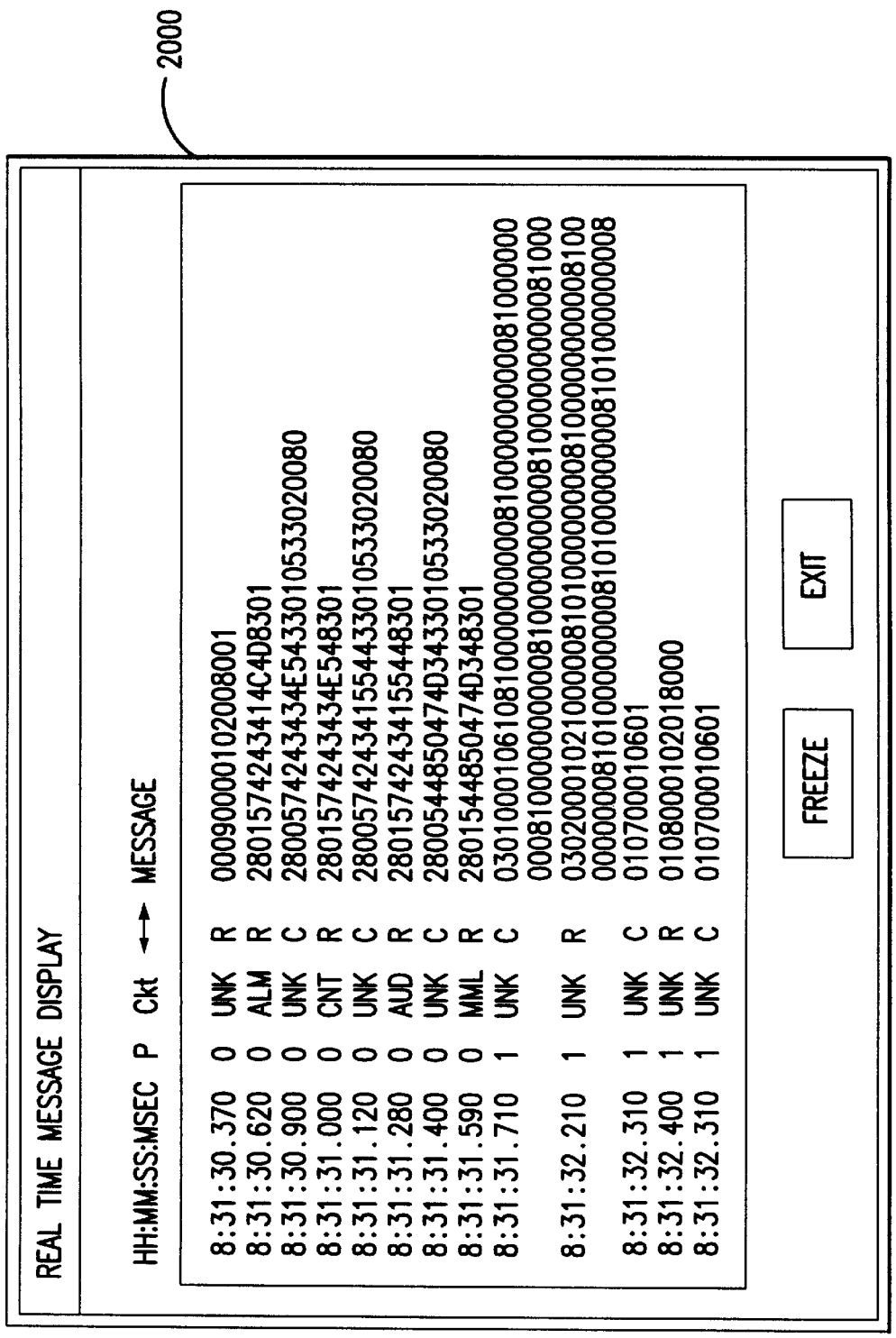

The View Real Time Message Display window 2000, as shown in FIG. 20, displays incoming and outgoing messages like the Communication Log except the newly-logged data is scroll-displayed in real-time (step 616). This display allows the user to monitor and trouble-shoot emulator and/or MCS performance in real-time during emulator operation.

DXC Network Type

According to the present invention, different types of digital cross-connect networks are emulated including DXC 3/3, DXC 3/3 and 3/1, and/or DXC 1/0 networks. A DXC 1/0 network with dynamically configured paths established through channel level commands and port provisioning was primarily described with respect to FIGS. 7 to 20. The Emulator topology data 312 traces logical trunks through adjacent DXC 1/0 nodes and provisions cross-connected port channels. Partial or total trunks outages are emulated. Even without complete path topology data, dynamic inter-DXC trunk (i.e. channel) connections are emulated in response to user and/or MCS commands.

When hybrid DXC 3/3 and 3/1 networks with an even more rigid topology are emulated, the MCS 104 is also more likely to be involved in restoration. See, the commonly-assigned, co-pending, related application, "Method and Apparatus for Emulating a Digital Cross-Connect Switch Network using a Flexible Topology to Test MCS Network Management," Ser. No. 08/641,461, by John V. McLain, Jr., incorporated above by reference.

More rigid topologies as in a DXC 3/3 network can be emulated to further test MCS restoration. Intermediate site and equipment carrying the logical trunks between DXC nodes can be stored and updated in the Emulator topology data 312. See, for example, the identification of DXC 3/3 node types and topology data 312 used to emulate a DXC 3/3 network in the commonly-assigned, co-pending, related application, "Method and Apparatus for Emulating a Digital Cross-Connect Switch Network," Ser. No. 08/641,459, by John V. McLain, Jr., incorporated above by reference.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An emulator apparatus for emulating a dynamically-configured digital cross-connect switch network to allow testing of a communication network monitor and control system (MCS), the emulator apparatus comprising:

a communication module which communicates with the MCS over at least one emulator control link using a communications protocol substantially identical to a communications protocol used in the digital cross-connect switch network to communicate to the MCS;

a memory unit for storing emulated network data representative of the behavior and topology of the emulated digital cross-connect switch network, wherein said emulated network data includes configuration data identifying the transmission behavior of DXC nodes in the digital cross-connect network and topology data identifying logical trunks extending through corresponding ports in the said DXC nodes; and a processor coupled to said communication module and said memory unit, said processor sending emulator messages for the MCS to said communication module based on said emulated network data, said emulator messages emulating messages which would be sent from the digital cross-connect switch network to the MCS.

2. The emulator apparatus of claim 1, wherein said topology data further comprises port provision data which identifies an allocation of channels between cross-connected ports for each DXC node.

3. The emulator apparatus of claim 2, wherein said processor dynamically configures at least one path through said topology data in response to MCS channel level commands.

4. The emulator apparatus of claim 3, wherein:
each dynamically-configured path comprises at least one logical inter DXC trunk between adjacent DXC nodes, and
said MCS channel level commands include connect and disconnect commands for switching cross-connected channels between cross-connected ports in each of said adjacent DXC nodes to dynamically establish and break down said at least one logical inter-DXC trunk forming said path.

5. The emulator apparatus of claim 4, wherein said processor updates said port provision data in response to said MCS connect and disconnect commands.

6. The emulator apparatus of claim 1, wherein said digital cross-connect network comprises a DXC 1/0 network.

7. The emulator apparatus of claim 1, wherein said processor further comprises:
a control link servicer which detects incoming MCS messages sent to the emulator apparatus by the MCS;
a user-interface servicer which detects user inputs received through a user-interface, said processor updates at least one of said configuration data and said topology data to emulate the presence and absence of selected network failures identified by user-inputs; and
an emulator message generator, wherein said emulator message generator generates emulator messages in response to said incoming MCS messages detected by said control-link servicer based on at least one of said configuration data and said topology data, said emulator messages matching messages which would be sent from DXC nodes in the emulated digital cross-connect network in response to the detected incoming MCS messages.

8. The emulator apparatus of claim 7, wherein said processor further determines whether said generated emulator messages correspond to DXC nodes which are transmitting based on said configuration data, said processor sending emulator messages generated by the emulator message generator only for transmitting nodes.

9. The emulator apparatus of claim 8, wherein said configuration data includes a node transmission field representing whether each DXC node in the digital cross-connect network is emulated as a transmitting or non-transmitting node.

10. The emulator apparatus of claim 7, wherein said at least one emulator control link emulates respective at least one network node control links used to couple DXC nodes in the digital cross-connect network to the MCS.

11. The emulator apparatus of claim 10, wherein said at least one emulator link includes a first emulator control link and a second emulator control link, said first and second emulator control links emulating corresponding first and second network control links between DXC nodes in the digital cross-connect switch network and the MCS; and wherein said processor further comprises:
an emulator link selector which selects at least one of said first and second emulator control links depending upon whether corresponding first and second network control links are enabled at a DXC node based on said configuration data, said communication module sending emulator messages generated by the emulator message generator over said at least one selected emulator primary and secondary control link.

12. The emulator apparatus of claim 11, wherein said configuration data includes first and second link active fields which identify whether respective first and second network node control links are emulated as transmitting or non-transmitting links for each DXC node in the digital cross-connect network.

13. The emulator apparatus of claim 1, wherein said communication module comprises at least one logical router, each logical router being connected between said processor and a respective emulator control link, and wherein each logical router multiplexes messages for a respective group of DXC nodes in the digital cross-connect network.

14. The emulator apparatus of claim 1, wherein said communication protocol comprises a standard data communication protocol including at least one selected from the following group of standard data communications protocols: X.25, IP, TCP, Frame-Relay, ATM, SMDS, Ethernet, FDDI, ISDN, SDLC, and BISDN.

15. The emulator apparatus of claim 7, wherein said processor switches control transparently between said control-link servicer and said user-interface servicer to service said at least one emulator control link and user-inputs in a pseudo-parallel sequence simulating multi-tasking.

16. The emulator apparatus of claim 15, wherein:
said user-link servicer comprises a first program module for executing a first task to service said user-interface, said first program module having a control switch call after each partial logic unit of work in said first task;
said control link servicer comprises a second program module for executing a second task to service incoming MCS messages received over said at least one emulator control link; and
said processor further comprises a simulated multi-task controller for transparently switching control between said user-link servicer and said control link servicer;
wherein said simulated multi-tasking controller switches control from said user-link servicer to said control link servicer when said control switch call is read during execution of said first program module and an incoming MCS message is detected, and switches control from said control link-servicer back to said user-interface servicer to resume said first task after a partial logical unit of work in the second task has been executed by said control link servicer.

17. The emulator apparatus of claim 1, wherein said processor provides sub-second responses to the MCS and a user-interface.

18. The emulator apparatus of claim 1, wherein the emulator apparatus is run on a stand-alone personal computer connected to the MCS.

19. The emulator apparatus of claim 1, wherein user-inputs are entered through a user-interface for controlling the emulator apparatus.

20. The emulator apparatus of claim 19, wherein said user inputs include dynamic configuration inputs identifying changes in DXC node behavior or the topology of the emulated digital cross-connect network, and said processor updates said emulated network data in accordance with said dynamic configuration inputs.

21. The emulator apparatus of claim 1, wherein said processor detects user inputs identifying a selected network failure and generates an outage script file representative thereof.

22. The emulator apparatus of claim 21, wherein said selected network failure represents at least one of a partial trunk failure, total trunk failure, and node failure.

23. The emulator apparatus of claim 1, wherein said processor executes a user-selected outage script file, corresponding to a selected network failure, and sends emulator alarm messages to the MCS which emulate the behavior of DXC nodes in the digital cross-connect network in the presence of the selected network failure.

24. The emulator apparatus of claim 1, wherein said processor detects a user input selecting an outage script file for normalization, said outage script file corresponding to a selected network failure, and sends emulator clear alarm messages to the MCS which emulate the behavior of DXC nodes in the digital cross-connect network during normalization of the selected network failure.

25. The emulator apparatus of claim 1, further comprising a user-interface module for displaying emulator control options at the user-interface including at least one of outage selection, normalization/clear alarms, view communication log, view trace log, and view real-time message display; wherein said processor responds to a user-input identifying an emulator control option and executes a corresponding emulator control routine.

26. The emulator apparatus of claim 1, wherein said topology data includes initial baseline topology data created from at least one of an external database, the MCS, and manual user-input.

27. The emulator apparatus of claim 1, wherein said processor maintains a communication log file which includes all incoming MCS commands sent to the emulator apparatus and all outgoing solicited and unsolicited emulator messages sent from the emulator apparatus to the MCS.

28. The emulator apparatus of claim 1, wherein said processor maintains a trace log file which includes error messages generated by said processor during operation of the emulator apparatus.

29. The emulator apparatus of claim 7, wherein said incoming MCS messages include session connect, keep alive, initialization, alarm audit, configuration status, and cross-connect commands.

30. The emulator apparatus of claim 7, wherein said emulator messages sent to the MCS include session connected, control implementation confirmation, control not implemented with reason code, solicited status of alarm, solicited status of node configuration, and unsolicited alarm messages.

31. The emulator apparatus of claim 1, wherein the digital cross-connect network comprises a DXC 3/3 network, a hybrid DXC 3/3 and 3/1 network, or a DXC 1/0 network.

32. A computer-implemented method for emulating a digital cross-connect network having dynamically-configured paths to test a network monitoring and control system (MCS), comprising the steps of:
storing emulated network data representative of the behavior and topology of the digital cross-connect network being emulated, said emulated network data including configuration data representative of the behavior of each DXC node in the digital cross-connect network being emulated and topology data identifying logical trunks extending between adjacent nodes in the digital cross-connect network, each dynamically-configurable path comprising at least one logical trunk;
establishing connectivity with the MCS over at least one emulator control link;
detecting incoming MCS messages; and
sending emulator messages over said at least one emulator control link to the MCS in response to said incoming MCS messages based on said emulated network data, said emulator messages emulating messages which would be sent from DXC nodes in the digital cross-connect network being emulated to the MCS in response to said detected incoming MCS messages.

33. The method of claim 32, further comprising the step of storing port provision data which identifies an allocation of channels between cross-connected ports for each DXC node.

34. The method of claim 33, further comprising the steps of:
receiving MCS channel level commands including connect and disconnect channels for switching cross-connected channels between cross-connected ports; and
updating said port provision data in response to said connect and disconnect commands to emulate the dynamic establishing and breaking down of paths in the digital cross-connect switch network.

35. The method of claim 32, further comprising the steps of:
detecting user inputs identifying a modification in at least one of the behavior or topology of the emulated digital cross-connect network;
updating said emulated network data to represent said modification; and
sending emulator messages in response to said detected user-inputs, said emulator messages emulating solicited and unsolicited messages which would be sent from DXC nodes when the digital cross-connect network is configured according to said modification.

36. The method of claim 35, wherein said modification comprises a selected network failure, said selected network failure representing at least one of a partial trunk failure, total trunk failure, and node failure.

37. The method of claim 32, wherein the digital cross-connect network comprises a DXC I/O network.

38. The method of claim 32, further comprising the steps of:
selecting an emulator control link corresponding to an enabled network control link based on said configuration data; and
sending each message generated in said generating step to the MCS over the respective emulator control link selected in said selecting step, thereby, emulating messages sent from DXC nodes over corresponding enabled network control links to the MCS.

39. The method of claim 32, further comprising the steps of:
executing an outage script file corresponding to a selected network failure; and
sending emulator alarm messages to the MCS which emulate the behavior of DXC nodes in the digital cross-connect network in the presence of the selected network failure.

40. The method of claim 32, further comprising the steps of:
executing an outage script file corresponding to a selected network failure to normalize the digital cross-connect network; and
sending emulator clear alarm messages to the MCS which emulate the behavior of DXC nodes in the digital cross-connect network during normalization of the selected network failure.

41. The method of claim 32, further comprising the steps of:
displaying emulator control options at a user-interface, said emulator control options including at least one of outage selection, normalization/clear alarms, view communication log, view trace log, and view real-time message display;

detecting a user-input selecting one of said emulator control options; and executing a corresponding emulator control routine.

42. The method of claim 32, further comprising the steps of:

detecting user inputs identifying a selected network failure; and generating an outage script file which identifies near-side port alarms for DXC nodes having near-side ports facing said selected network failure.

43. The method of claim 32, wherein the digital cross-connect network comprises a DXC 3/3 network, a DXC 3/3 and 3/1 network, or a DXC 1/0 network.

* * * * *